United States Patent [19]
Gotoh et al.

[11] Patent Number: 6,027,196
[45] Date of Patent: Feb. 22, 2000

[54] RECORDING METHOD FOR GRADATION RECORDING WITH LIGHT-AND DARK-COLORED INKS AND APPARATUS THEREFOR

[75] Inventors: Fumihiro Gotoh, Kawasaki; Hiromitsu Hirabayashi, Yokohama; Toshio Kashino, Chigasaki; Yuji Akiyama, Yokohama; Hitoshi Sugimoto, Kawasaki; Miyuki Matsubara, Tokyo; Hidehiko Kanda, Yokohama, all of Japan

[73] Assignee: Canon Kabushiki Kaisha, Tokyo, Japan

[21] Appl. No.: 08/901,937

[22] Filed: Jul. 29, 1997

Related U.S. Application Data

[63] Continuation of application No. 08/175,711, Dec. 30, 1993, abandoned.

[30] Foreign Application Priority Data

Jan. 8, 1993 [JP] Japan ..................................... 5-001958
Mar. 19, 1993 [JP] Japan ..................................... 5-060306

[51] Int. Cl.⁷ ..................................................... B41J 2/195
[52] U.S. Cl. ..................................... 347/7; 347/15; 347/19
[58] Field of Search ..................................... 347/7, 19, 15

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,604,633 | 8/1986 | Kimura et al. ............................... 347/7 |
| 4,608,577 | 8/1986 | Hori . |
| 4,631,548 | 12/1986 | Milbrandt ................................... 347/15 |
| 4,635,078 | 1/1987 | Sakwada et al. ........................... 347/15 |
| 4,684,962 | 8/1987 | Hirosawa et al. . |
| 4,723,129 | 2/1988 | Endo et al. . |
| 4,740,796 | 4/1988 | Endo et al. . |
| 4,835,551 | 5/1989 | Ng ............................................. 347/240 |
| 4,908,635 | 3/1990 | Iwasawa et al. . |
| 4,959,659 | 9/1990 | Sasaki et al. ............................... 347/43 |
| 5,132,711 | 7/1992 | Shinada et al. ........................ 347/19 X |
| 5,355,159 | 10/1994 | Kaneko ..................................... 347/7 X |

FOREIGN PATENT DOCUMENTS

| | | |
|---|---|---|
| 0150119 | 7/1985 | European Pat. Off. . |
| 0388978 | 9/1990 | European Pat. Off. . |
| 0390198 | 10/1990 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 62-152859 | 7/1987 | Japan . |
| 5-5156 | 1/1991 | Japan ............................... B41J 2/175 |
| 5-5157 | 1/1991 | Japan ............................... B41J 2/175 |

OTHER PUBLICATIONS

European Official Communication, dated Nov. 5, 1998.

*Primary Examiner*—N. Le
*Assistant Examiner*—Shih-Wen Hsieh
*Attorney, Agent, or Firm*—Fitzpatrick, Cella, Harper & Scinto

[57] ABSTRACT

In forming an image with plural recording heads corresponding to plural inks of different densities, the image data are so distributed that the image is formed with the ink of low density until the image density reaches a predetermined density level, but is formed with the inks of low and high densities when the image density exceeds the predetermined density level, and the distributed data are corrected according to the detection of temperature relating to the recording heads, whereby a desired recorded image can be obtained even in the presence of a variation in the head temperature. Also the image data are distributed in such a manner that, when the remaining amount of one of the plural inks becomes low, the recording is conducted with the remaining ink, whereby a desired image can be obtained even when the remaining amount of one of the plural inks with different densities becomes low.

34 Claims, 31 Drawing Sheets

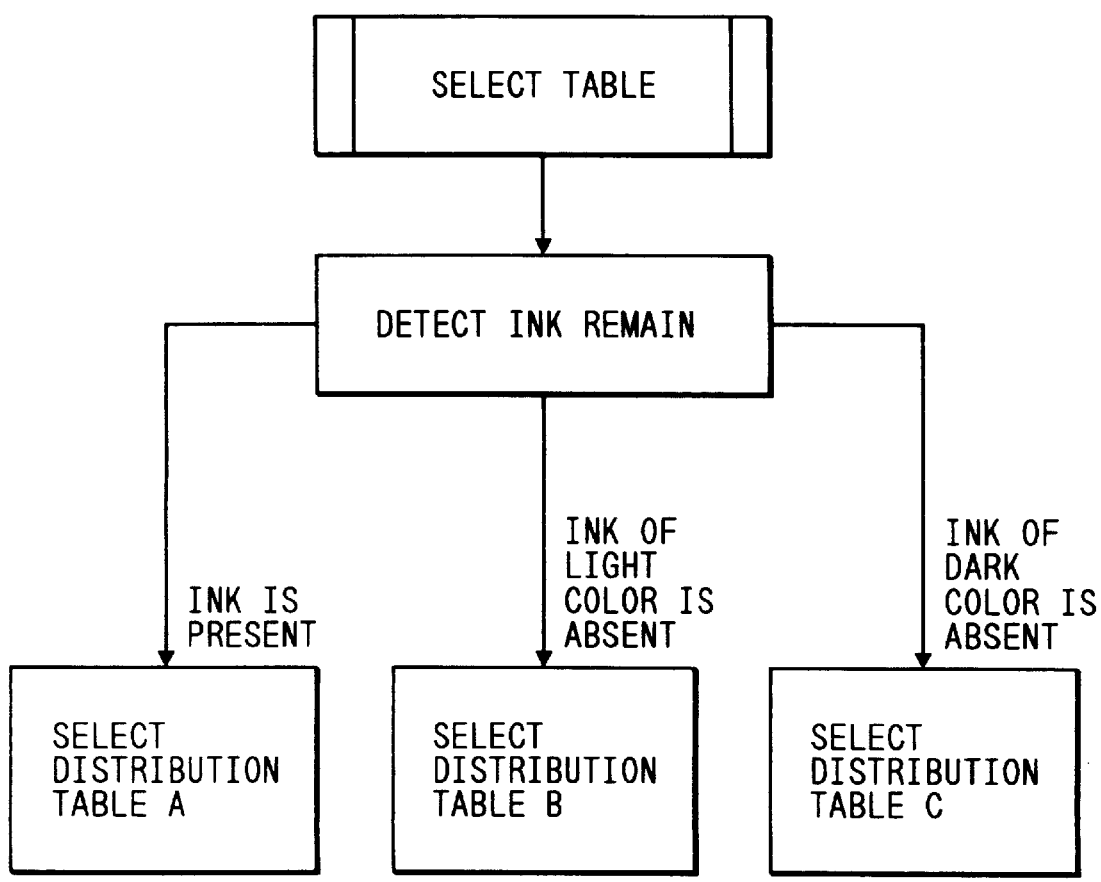

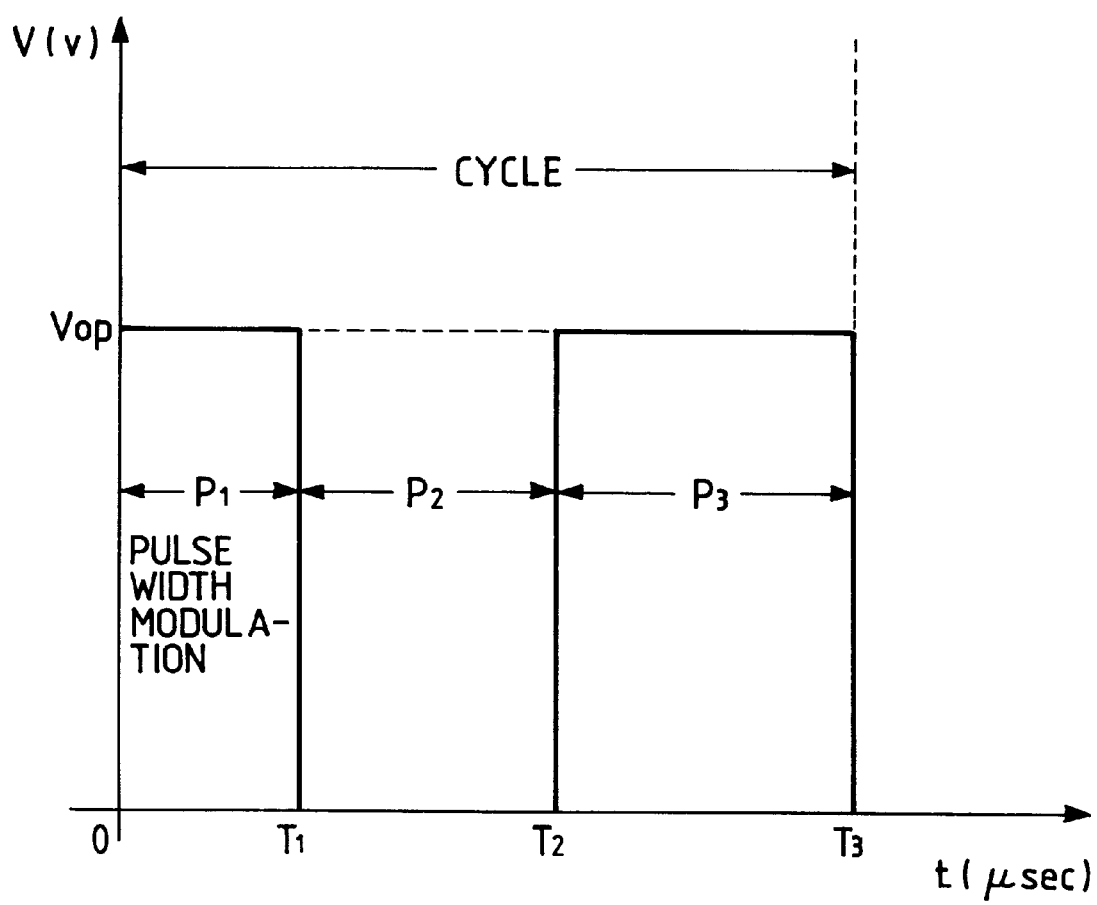

RECORDING METHOD FOR GRADATION RECORDING WITH LIGHT-AND DARK-COLORED INKS AND APPARATUS THEREFOR

This application is a continuation of application Ser. No. 08/175,711 filed Dec. 30, 1993, now abandoned.

BACKGROUND OF THE INVENTION

1. Field of the Invention

The present invention relates to an ink jet recording method for recording on a recording medium, by discharging ink from discharge openings of a recording head, utilizing plural inks of a same color with different densities, and an apparatus therefor.

2. Related Background Art

In the conventional ink jet recording method, the record is formed by depositing ink droplets onto a recording material such as paper, by discharging ink from plural ink discharge openings formed on a recording head, based on data signals. Such recording method is utilized for example in a printer, a facsimile apparatus or a copying apparatus.

In such an apparatus there are known a method of utilizing an electric-thermal energy converting member in which a heat-generating element (electric-thermal energy converting member) is given an electric signal to locally heat the ink thereby inducing a variation in the pressure thereof and discharging the ink from the discharge opening, and a method utilizing an electric-mechanical converting member such as a piezoelectric element.

In such recording methods, a half tone recording is achieved by the dot density control in which the half tone is represented by the control of the number of recording dots per unit area, while the recording dots are maintained at a constant size, or by the dot diameter control in which the half tone is represented by the control of the size of the recording dots.

In general, the former dot density control is more popularly utilized, since the latter dot diameter control requires and is limited by the complex control method for delicately varying the recording dot size.

Also in case the ink discharge means consists of the electric-thermal energy converting member which can achieve a high resolving power because it enables easier manufacture and can be arranged with a high density, the above-mentioned dot density control is generally employed since the amount of variation in pressure is difficult to control, so that the diameter of the recording dot is difficult to modulate over a wide range.

One of the representative binarization methods employed in said dot density control for the continuous tone representation is the systematic dither method, but said method is associated with a drawback that the number of gradation levels is limited by the matrix size. More specifically, a larger number of gradation levels requires a larger matrix size, which leads to a larger pixel composed of said matrix in the recorded image, whereby the resolving power becomes deteriorated.

Another representative binarization method is the conditionally determined dither method, such as the error diffusion method, in which the threshold value is varied in consideration of the pixels surrounding the input pixel, in contrast to the above-mentioned systematic dither method, which is an independently determined dither method wherein the threshold value for binarization is determined independently from the input pixel. Said conditionally determined dither methods, represented by the error diffusion method, have certain advantages such as the compatibility of the gradation and the resolving power, and extremely little generation of the moire pattern in the recorded image in case the original image is a printed image, but is also associated with a drawback of granularity in the lighter area of the image, leading to a tendency that the image quality is evaluated as low. This drawback is particularly conspicuous in a recording apparatus with a low recording density.

For overcoming such granularity, there has been proposed a recording method, in an ink jet recording apparatus, of providing two recording heads for respectively discharging lighter-colored ink and darker-colored ink, and forming the recording dots with the light-colored ink from the low-density (light) level to the intermediate density level of the image, and with the dark-colored ink from the intermediate density level to the high-density (dark) level of the image.

FIG. 4 shows a principal part of a conventional color ink jet recording apparatus of the serial printing type, employing such light and dark inks.

On a carriage 401 there are provided, with a predetermined mutual distance, a recording head Bkk for discharging dark black-colored ink, a head Bku for discharging light black-colored ink, a head Ck for discharging dark cyan-colored ink, a head Cu for discharging light cyan-colored ink, a head Mk for discharging dark magenta-colored ink, a head Mu for discharging light magenta-colored ink, a head Yk for discharging dark yellow-colored ink, and a head Yu for discharging light yellow-colored ink.

A recording material, consisting for example of paper of a thin plastic sheet, is supplied through transport rollers (not shown) and is pinched between discharge rollers 402, and is advanced in the illustrated direction by an unrepresented transport motor.

The carriage is guided and supported by a guide shaft 403 and an encoder. Said carriage reciprocates along said guide shaft, by means of a driving belt 404, driven by a carriage motor 405.

In the interior (liquid path) of each ink discharge opening of the above-mentioned recording heads, there is provided a heat-generating element (electric-thermal converting member) for generating the thermal energy for ink discharge.

An image can be formed by driving said heat-generating elements based on the recording signals, according to the timings read by said encoder, and discharging and depositing the ink droplets onto the recording material, in the order of dark black, light black, dark cyan, light cyan, dark magenta, light magenta, dark yellow and light yellow.

In a home position of the carriage, selected outside the recording area, there is provided a recovery unit having a capping portion 406, for maintaining stability of the ink discharge.

The above-explained light-dark multi-density recording method employing plural inks of different densities for a same color can improve the gradation particularly in the highlight area, and can reduce the granularity by the dots, thereby attaining higher image quality even by a simple increase of the density levels from two to three. This is because the noises felt by the single dots in the highlight area can be reduced by the deposition of lighter ink (with lower density) in such highlight area.

However, in the ink jet recording apparatus employing such light and dark inks, the stable ink discharge may become difficult, depending on the situation of use. If, among plural inks of different densities of a same color, at least an ink cannot be discharged in stable manner, the desired image can no longer be obtained.

In such ink jet recording apparatus utilizing such dark and light inks, the multi-value luminance signals of R, G and B colors supplied from a host equipment are converted in a color processing unit into multi-value density signals of Y, M, C and Bk colors, which are then divided, by a distribution table of a dot developing unit, into those to be recorded with the dark inks and those to be recorded with the light inks, and thus divided signals are binarized for recording by the recording heads. Consequently, if either of the dark and light inks is exhausted or becomes low in the remaining amount, the desired image can no longer be obtained even though the colors required for image formation are still present.

Also the stability of the ink discharge amount is significantly influenced by the temperature of ink or recording head and that of the atmosphere. In general the discharge amount is low when the ink temperature is low, and becomes larger as the ink is heated. As a result there has been encountered a drawback that the density of the recorded image varies depending on the temperature of the recording inks.

SUMMARY OF THE INVENTION

In consideration of the foregoing, the present invention is to provide an ink jet recording method capable of providing a desired image even when the stable ink discharge becomes difficult in at least one among plural inks of different densities of a same color, and an apparatus therefor.

The above-mentioned object can be attained, according to the present invention, by an ink jet recording method for recording on a recording medium by discharging ink from discharge openings of a recording head, utilizing plural inks of different densities of a same color, wherein if the stable ink discharge becomes difficult in at least one among said plural inks, the recording is conducted with the ink of remaining kind.

Said recording head is preferably a head for discharging the ink utilizing thermal energy, provided with a thermal energy converting member for generating thermal energy to be given to the ink and adapted to induce a state change in the ink by the thermal energy applied by said thermal energy conversion member, thereby discharging the ink from the discharge opening based on said state change.

The present invention also provides an ink jet recording apparatus for recording on a recording medium by discharging ink from discharge openings of a recording head, utilizing plural inks of different densities of a same color, comprising distribution means for determining, according to the image signal, the proportion of use of each of said plural inks for forming pixels corresponding to said image signal; discrimination means for discriminating that the stable discharge of at least one of said plural inks has become difficult; and variation means for varying the proportion determined by said distribution means, based on the result of discrimination by said discrimination means, in order to effect recording with ink other than the ink of which stable discharge has become difficult.

According to the present invention, there are provided plural distribution tables for the inks of different densities, and, when the stable discharge of at least one of said plural inks has become difficult, said distribution tables are selectively used to effect the recording with the remaining inks thereby enabling to continue stable recording.

Also the present invention, reached in consideration of the aforementioned drawback in the prior art, is to provide an ink jet recording apparatus capable of providing a desired image recording density even when the temperature of the recording head varies, thereby enabling recording with excellent gradation.

The above-mentioned object can be attained, according to the present invention, by an ink jet recording apparatus for forming an image with plural recording heads corresponding to plural inks of different densities, comprising temperature detection means for detecting the temperature relative to said recording heads; distribution means for distributing the image data into data respectively corresponding to said plural inks; and correction means for correcting the data distributed by said distribution means, based on the temperature data detected by said temperature detection means.

The present invention also provides a recording apparatus for forming an image with plural recording heads corresponding to plural inks of different densities, comprising temperature detection means for detecting the temperature relative to said recording heads; and distribution means for distributing the image data into plural data respectively corresponding to said plural inks and also according to the temperature data detected by said temperature detection means.

The present invention furthermore provides a recording method for forming an image with plural recording heads corresponding to plural inks of different densities, comprising steps of detecting the temperature relative to said recording heads, distributing the image data into plural data respectively corresponding to said plural inks and also corresponding to said detected temperature data, and forming an image on a recording medium with said recording heads, based on said distributed data.

According to the present invention, the temperature relative to the recording heads is detected, then the image data are distributed into plural data respectively corresponding to the plural inks and also corresponding to the detected temperature data, and an image is formed on a recording medium with said recording heads, based on said distributed data. Thus a desired image recording density can be obtained even when the temperature of the recording heads varies, and the tonal reproducing ability can be significantly improved.

BRIEF DESCRIPTION OF THE DRAWINGS

FIG. 2 is a flow chart showing the sequence of selecting tables for distributing the density signals of different colors into signals of different densities corresponding to the inks of different densities;

FIG. 31 is a chart for explaining the driving method by divided pulse width modulation;

DETAILED DESCRIPTION OF THE PREFERRED EMBODIMENTS

Figure 5:
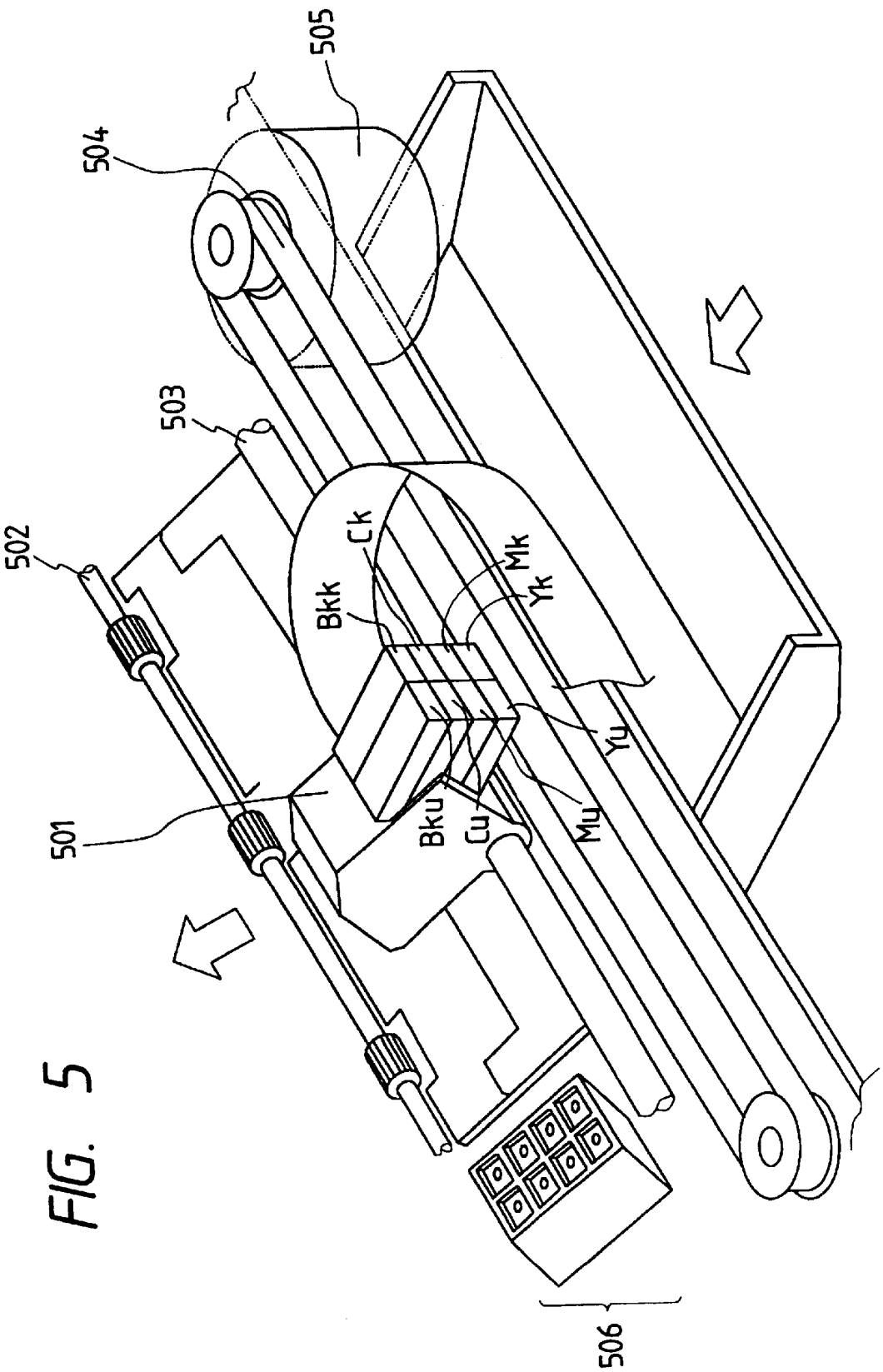
FIG. 5 is a perspective view showing the principal part of a color ink jet recording apparatus embodying the present invention.

FIG. 5 is a perspective view showing the principal part of a color ink jet recording apparatus embodying the present invention.

On a carriage 501 there are provided, with a predetermined distance, ink jet units respectively having an array of discharge openings for discharging light black-colored ink, an array for light cyan-colored ink, an array for light magenta-colored ink, and an array for light yellow-colored ink, and ink jet units respectively having an array of discharge openings for discharging dark black-colored ink, an array for dark cyan-colored ink, an array for dark magenta-colored ink and an array for dark yellow-colored ink.

A recording material, such as paper or a thin plastic sheet, is supplied by transport rollers (not shown), and is pinched by discharge rollers 502 for advancement in the direction of an arrow, by means of an unrepresented transport motor. Said carriage is guided and supported by a guide shaft 503 and an encoder. Said carriage reciprocates along said guide shaft, by means of a driving belt 504 driven by a carriage motor 505. In the interior (liquid path) of each ink discharge opening of the above-mentioned ink jet unit, there is provided a heat-generating element (electric-thermal energy converting member) for generating the thermal energy for ink discharge.

An image can be formed by driving said heat-generating elements based on the recording signal and according to the timings read by said encoder, and discharging and depositing ink droplets onto said recording material in the order of the dark-colored inks and then the light-colored inks. In a home position of the carriage, selected outside the recording area, there is provided a recovery unit having a capping unit. When the recording operation is not conducted, the carriage is moved to said home position and the caps of said capping unit tightly cover the faces, having the ink discharge openings, of the corresponding ink jet units, thereby preventing the clogging of the discharge openings, resulting from the ink adhesion caused by evaporation of the ink solvent or from the deposition of dusts.

The capping function of said capping unit is also utilized for the idle discharge mode in which the ink is discharged from the discharge openings to said cap in a spaced state, in order to resolve discharge deficiency or clogging in the ink discharge openings of lower recording frequency, and utilized also for the recovery of the ink discharge openings showing deficient discharge, by activating an unrepresented motor in the capped state of said discharge openings thereby sucking ink forcedly from said discharge openings. Also adjacent to said capping unit, there may be provided a blade or a wiping member, for cleaning the faces, having the ink discharge openings, of the ink jet units.

Figure 6:
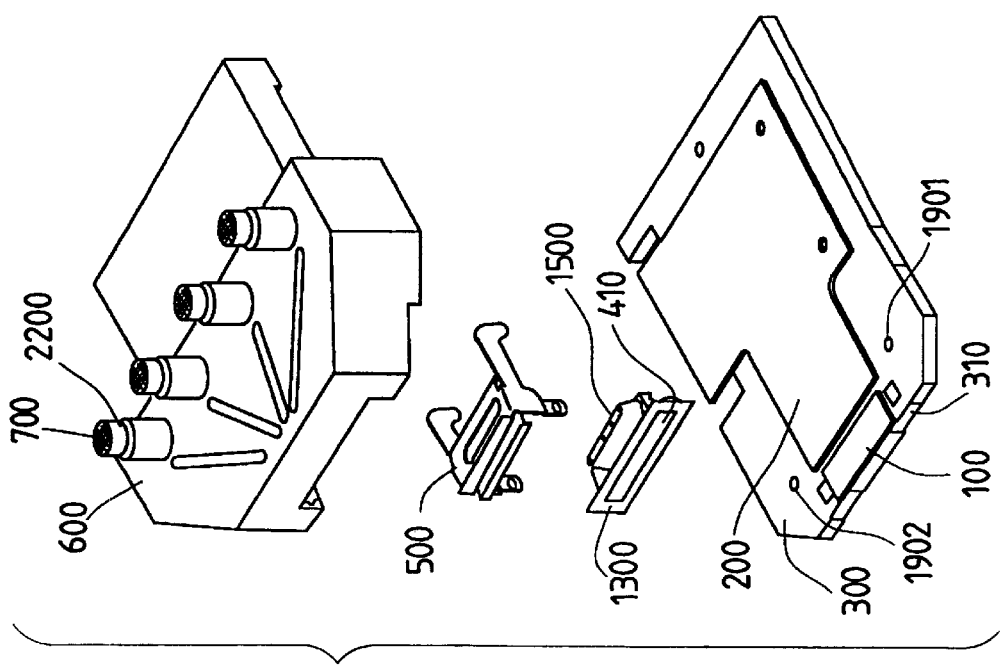
FIG. 6 is a view showing the structure of an ink jet unit of said embodiment.

FIG. 6 is an exploded perspective view showing the structure of the ink jet unit to be employed in the present embodiment, wherein a wiring board 200 is connected, at an end thereof, with the wirings of a heater board 100, and is provided, at the other end, with plural pads for receiving electrical signals from the main body of the apparatus, corresponding respectively to the electric-thermal energy conversion members. Consequently the electrical signals from said main body can be supplied to the respective electrothermal energy conversion members.

A metal support member 300, for supporting the rear surface of the wiring board 200 by planar contact, constitutes a bottom plate of the ink jet unit. A pressure spring 500 is provided, for applying an elastic pressure on a linear area in the vicinity of the ink discharge openings of a grooved ceiling plate 1300, with a portion formed in a substantially U-shaped cross section, claws for engaging with holes formed in the base plate, and a pair of rear legs for receiving the force, applied to the spring, by the base plate.

The force of said spring maintains the wiring board 200 and the grooved ceiling plate 1300 in pressurized contact. The wiring board 200 is adhered to the support member for example by adhesive material. At an end of an ink supply tube 2200, there is provided a filter 700. An ink supply member 600 is prepared by molding, and the grooved ceiling plate 1300 is provided with liquid paths communicating with the respective ink discharge openings. The ink supply member 600 is fixed to the support member 300 in simple manner by inserting two rear pins (not shown) of the ink supply member 600 into holes 1901, 1902 of the support member and thermally fusing the protruding ends of said pins.

In this state, there is formed a uniform gap between an orifice plate 410 and the ink supply member 600. Sealing agent is poured from an inlet formed on the upper part of said ink supply member, thereby sealing the bonding wires and the above-mentioned gap between the orifice plate 410 and the ink supply member 600, and is further guided through a groove 310 formed on the support member 300 thereby completely sealing the gap between the orifice plate 410 and the front end of the support member 300.

Figure 7:
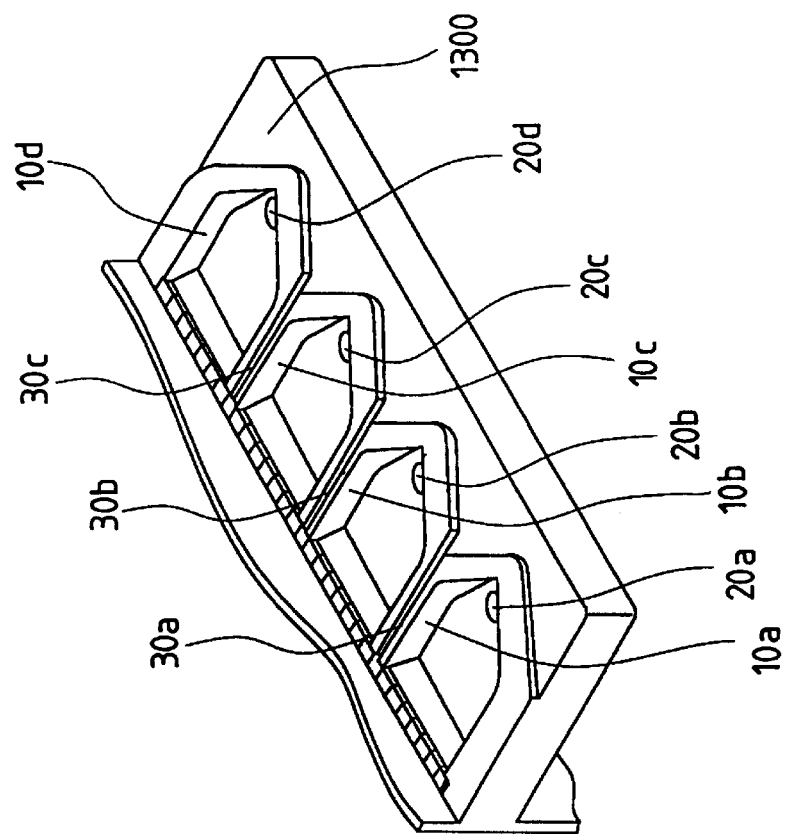
FIG. 7 is a view of the grooved ceiling board 1300 of the ink jet unit of said embodiment, seen from the side of the heater board 100.

FIG. 7 is a perspective view of the grooved ceiling plate 1300 to be employed in the present embodiment, seen from the side of the heater board 100. There are provided plural liquid chambers, which are mutually separated by partition walls 10a–10c and are respectively provided with ink supply openings 20a–20d.

Said partition walls 10a–10c are provided, on contact faces with the heater board 100, with grooves 30a–30c, which communicate with the external peripheral part of the grooved ceiling plate 1300. After said plate 1300 is maintained in contact with the heater board, said external peripheral part is sealed with the sealing agent as explained above. In this operation, the sealing agent enters along said grooves, thereby filling the gap between said board and the heater board. In this manner, the liquid chambers can be completely separated by the steps known in the conventional head. The structure of said grooves varies according to the physical properties of the sealing agent and has to be shaped corresponding to the sealing agent to be employed.

The above-explained structure of separate plural liquid chambers allows to supply different inks to the ink discharge openings.

Figure 8:
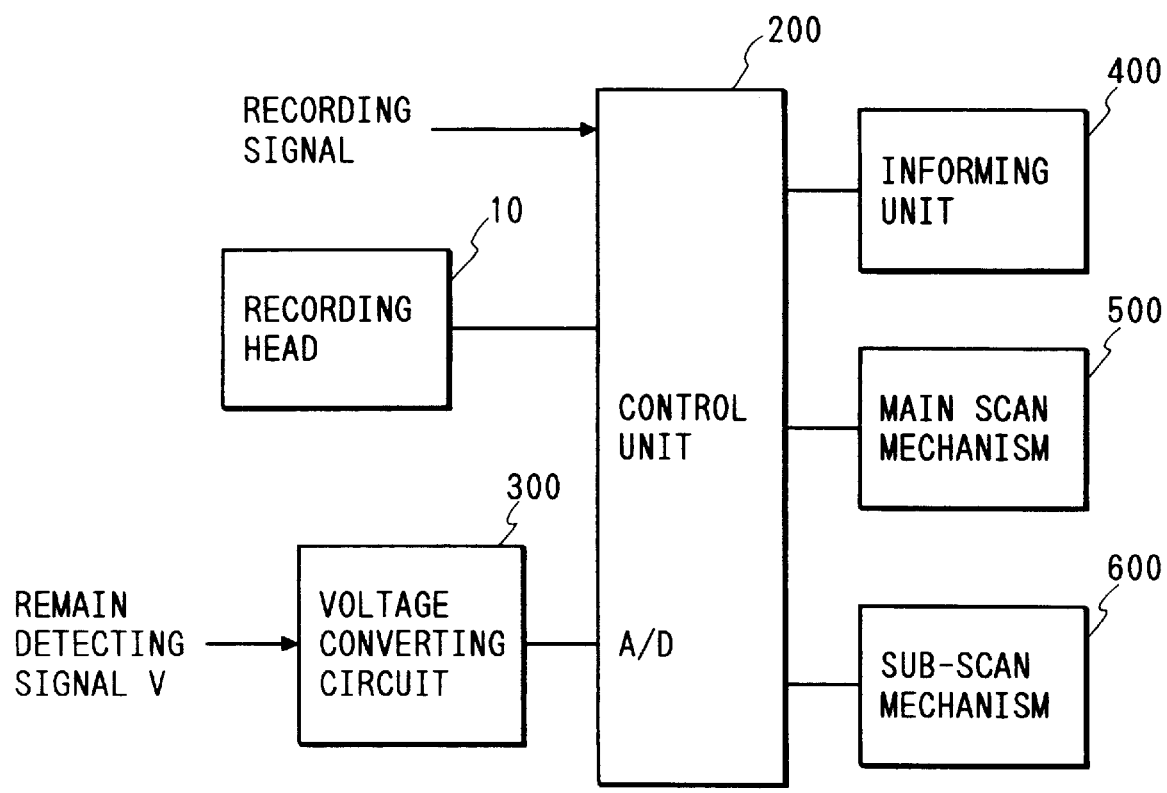
FIG. 8 is a block diagram showing an example of the control system of the apparatus.

In the following there will be explained the detection of the remaining ink amount. FIG. 8 shows an example of the control system in the present embodiment, wherein a control unit 200 in the form of a microcomputer incorporating an A/D converter determines the proportion of use of each of plural inks in the present invention, and varies the determined proportion. There are also shown a recording head unit 10, a voltage conversion circuit 300, an alarm device 400 composed of a display unit such as an LED, or an acoustic alarm device such as a buzzer, or a combination thereof, a main scanning mechanism 500 including a motor etc. for causing a scanning motion of the carriage HC in the recording operation, and a sub scanning mechanism 600 including a motor for transporting the recording medium etc. There is also shown a remaining amount detection signal V from a tank.

Figure 9:
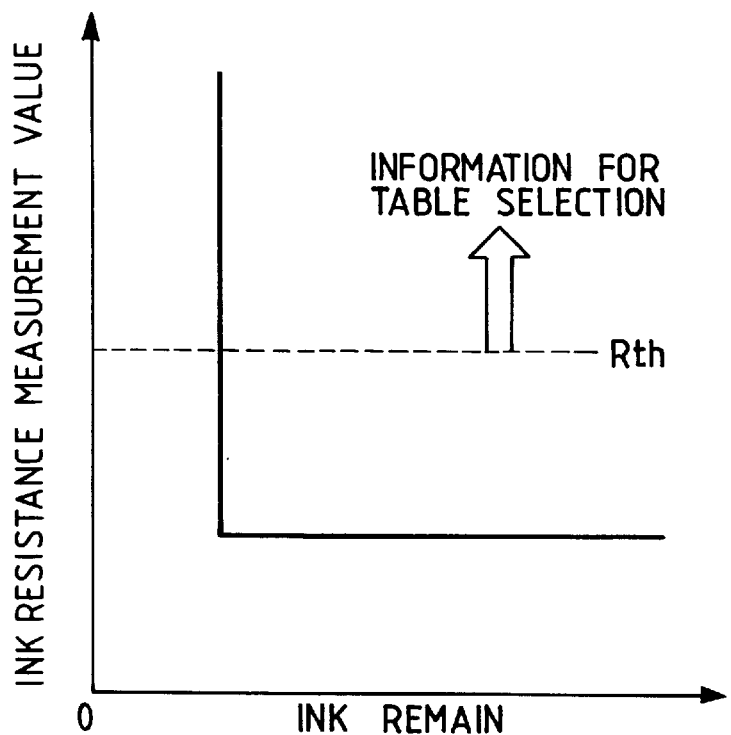
FIG. 9 is a chart showing the relationship between the remaining ink amount and the resistance between the electrodes for detecting the remaining ink amount.

In the present embodiment, a constant current is given between two electrodes provided in an ink chamber b, and the remaining ink amount therein is detected by the resistance between said two electrodes. The remaining ink amount and the resistance between the electrodes are correlated as shown in FIG. 9.

When the remaining ink amount reaches a predetermined amount or less, said resistance becomes higher to indicate that the remaining ink amount has reached said predetermined amount.

Figure 10:
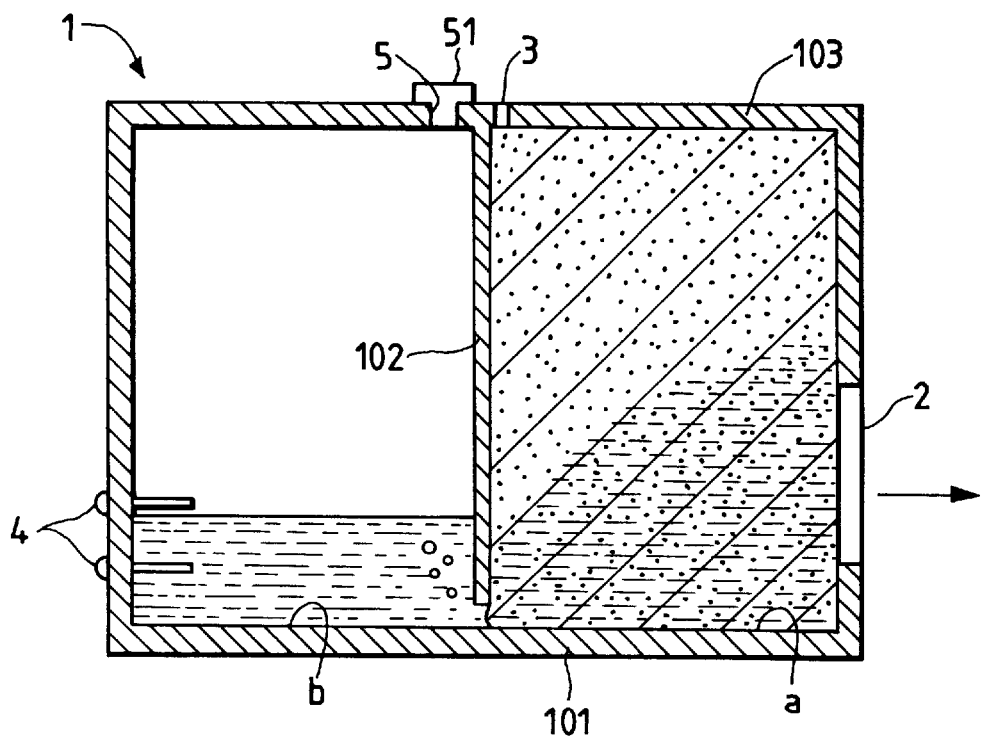
FIG. 10 is a view showing the state of detection of the remaining ink amount.

FIG. 10 illustrates an ink cartridge employed in the present embodiment, and shows the detecting operation for the remaining ink amount. The interior of the ink cartridge body 1, defined by the tank walls 101, is divided by a wall 102 into two ink chambers a, b which mutually communicate at the bottom. An ink chamber a is filled with a compressed absorbent member 103 with regulated capillary force. The ink cartridge is further provided with an ink supply part 2 for connection with the ink jet recording head, an air communicating part 3, pins (electrodes) 4 for detecting the remaining ink amount, and an ink filling aperture 5, which is closed with a stopper 51 made for example of rubber. The ink chamber b is maintained at a reduced pressure.

The positional relationship of the air communicating part 3, the ink supply part 2, the remaining amount detecting pins 4 and the ink filling aperture 5 is not limited to the illustrated one. When the ink surface in the ink chamber b becomes lower than the upper one of two electrodes 4, the resistance therebetween is abruptly elevated as shown in FIG. 10, whereby a corresponding voltage is generated therebetween. Said voltage is supplied either directly or through a voltage conversion circuit 300 to an A/D converter of the control unit for A/D conversion. When thus obtained detection value becomes larger than a predetermined value Rth, a signal for switching the distribution table is sent to a table selection circuit in the control unit 200.

In the present embodiment, the remaining ink amount is detected by the resistance between the electrodes provided in the ink tank, but such detection is not limited to the above-mentioned method and may also be achieved for example by a mechanical method or an optical method.

Figure 15:
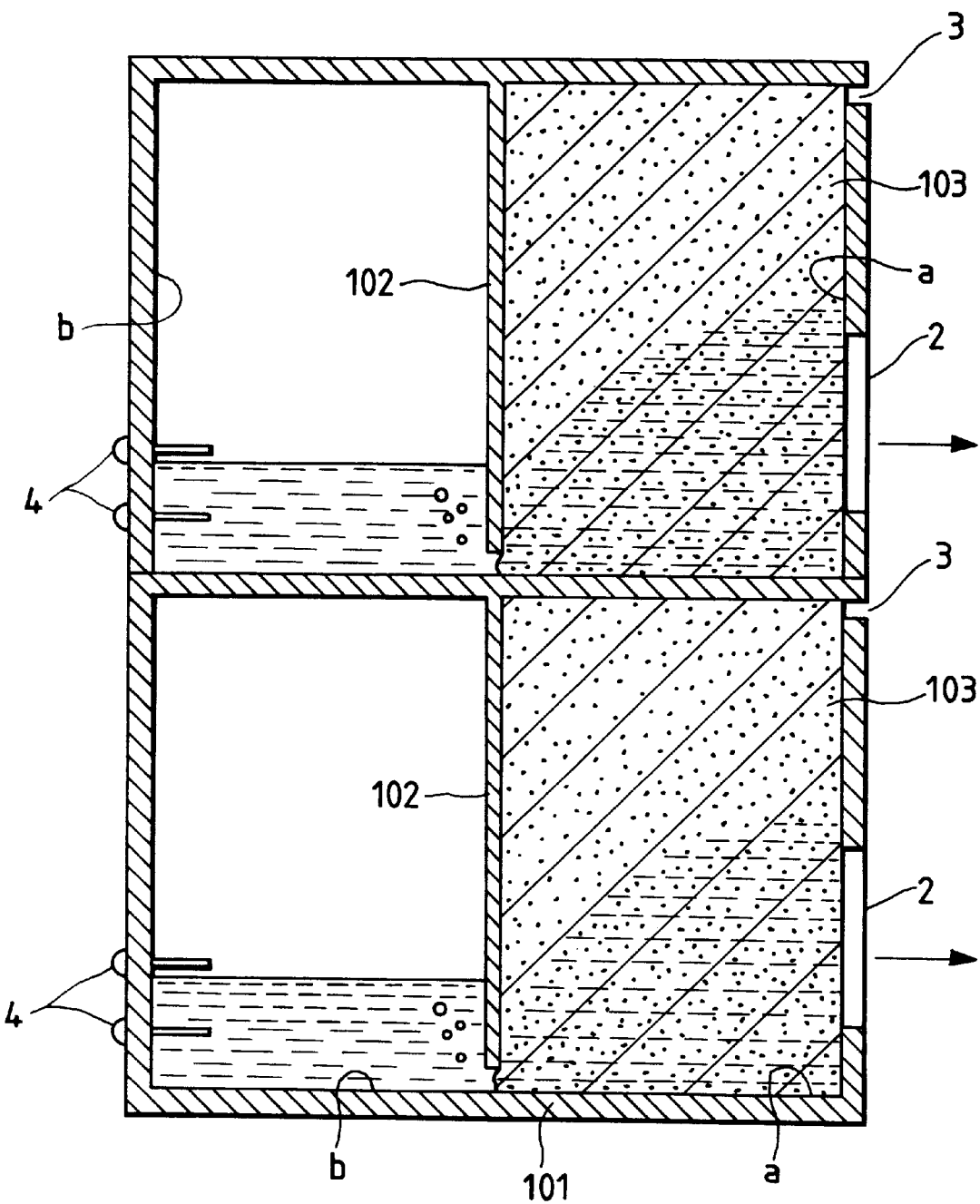
FIG. 15 is a cross-sectional view of a state in which a dark ink cartridge and a light ink cartridge are connected.

FIG. 15 is a cross-sectional view of a state in which the cartridge for dark ink and that for light ink are mutually connected, wherein the ink filling apertures 5 and the stoppers 51 are omitted. The upper and lower ink chambers b are both maintained at a reduced pressure.

Embodiment 1

Figure 1:
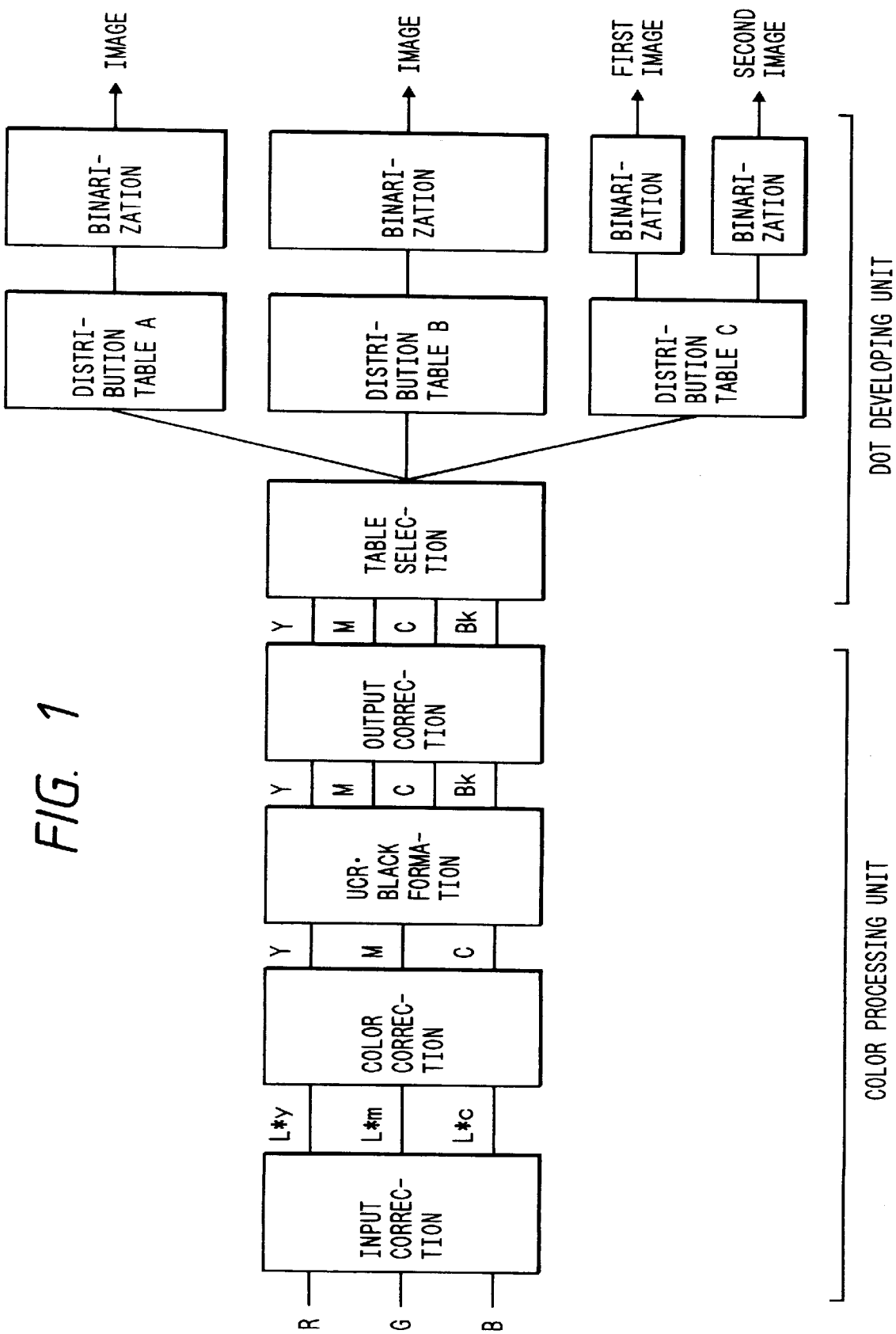
FIG. 1 is a view showing the flow of image signal processing.

FIG. 1 is a view best representing the feature of the present invention, showing the process flow in case of image printing with dark and light inks by table selection and also in case either of the dark and light inks of a same color is exhausted. In FIG. 1, a color processing unit converts the red image luminance signal R, the green image luminance signal G and the blue image luminance signal B, by an input correction circuit into a cyan image density signal C, a magenta image density signal M and a yellow image density signal Y. These signals are subjected to color processing and conversion into new image density signals C, M, Y, Bk of cyan, magenta, yellow and black colors in a color correction (masking) circuit and a UCR (undercolor removal)/black generation circuit, and is then subjected to gamma conversion into image density signals C, M, Y, Bk of cyan, magenta, yellow and black colors by an output correction circuit.

A dot developing unit positioned next selects the distribution table for distributing said density signals C, M, Y, Bk into those for recording heads for printing the inks of higher density and those for recording heads for printing the inks of lower density. According to thus selected distribution table, the density signals C, M, Y, Bk generated in the color processing unit are distributed into image density signals Ck, Mk, Yk, Bkk of dark cyan, dark magenta, dark yellow and dark black colors with higher dye densities and image density signals Cu, Mu, Yu, Bku of light cyan, light magenta, light yellow and light black colors of lower dye densities. Thus distributed signals are respectively binarized, and inks are discharged from the arrays of ink discharge openings of the ink jet units, according to said signals, thereby forming a color image.

Figure 3A:
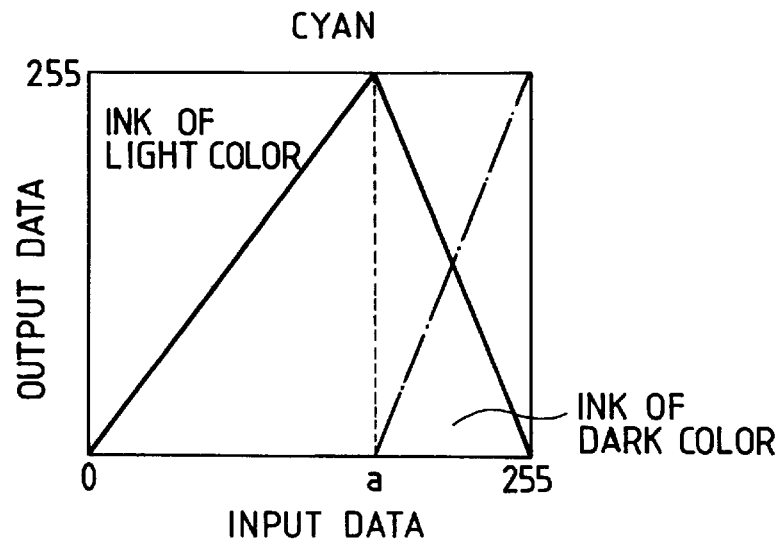
FIGS. 3A to 3C are views showing plural distribution tables for converting the input density signal of each color into light and dark output density signals.
Figure 3B:
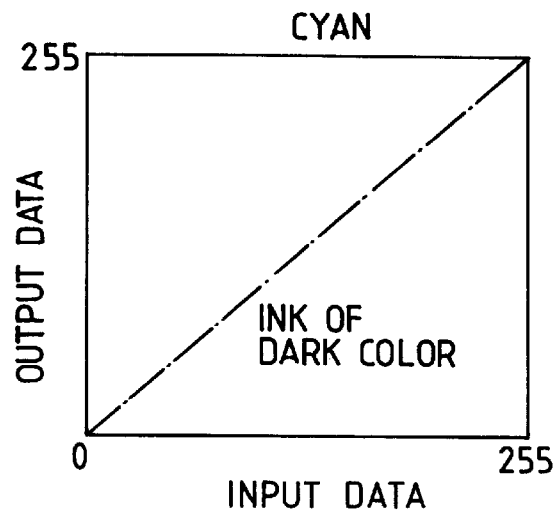
Figure 3C:
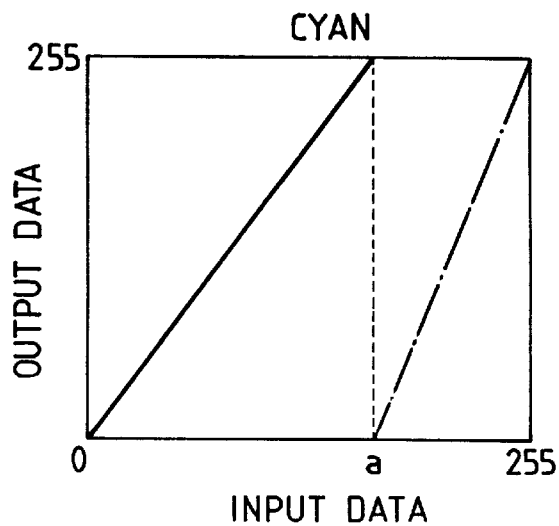
Figure 4:
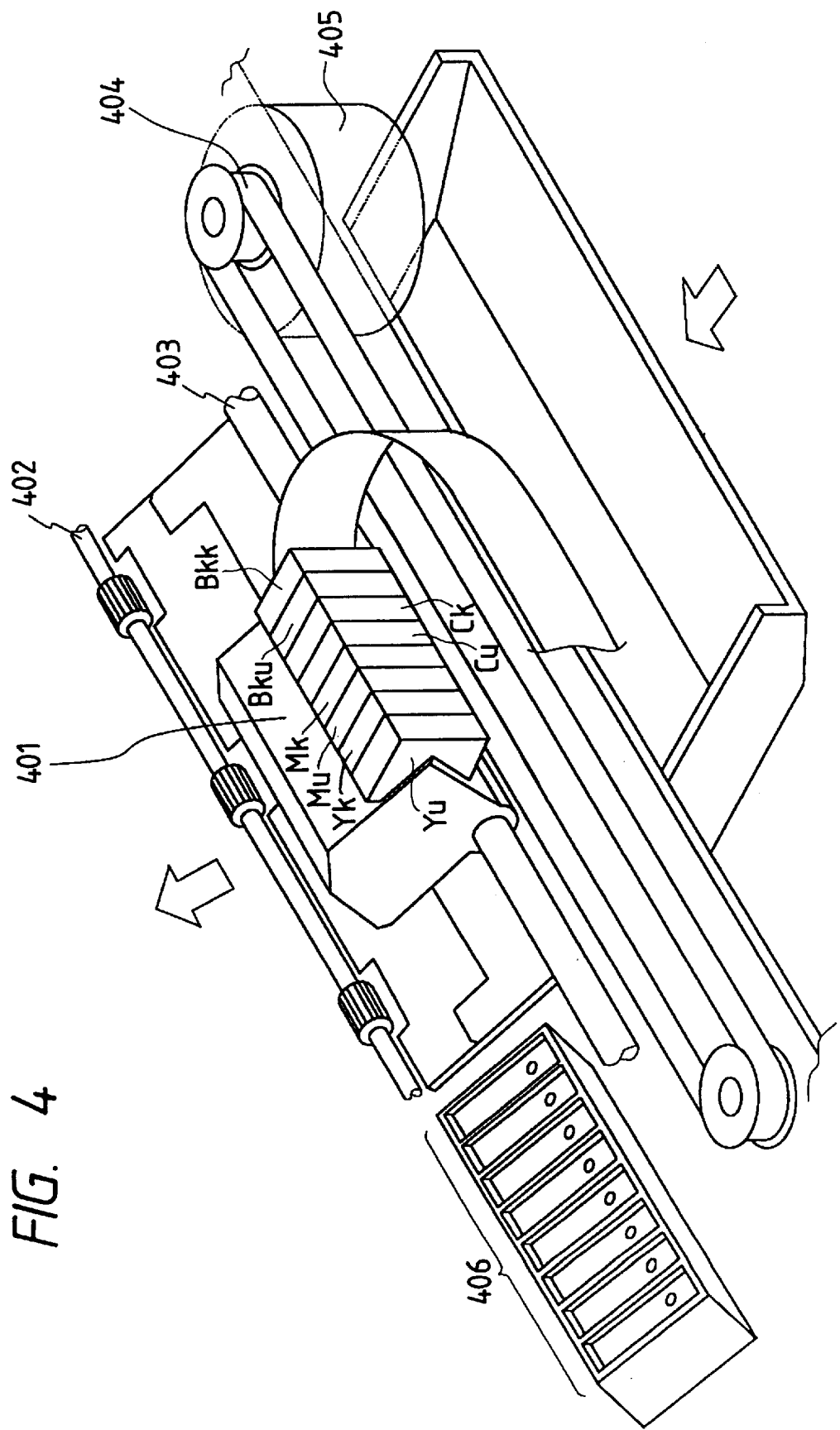
FIG. 4 is a view showing the principal part of a conventional color ink jet recording apparatus of the serial printing type, employing light and dark inks.

In FIG. 1, a distribution table A is used for distributing the printing data into those for dark inks and those for light inks so as to attain characteristics as shown in FIG. 2. A distribution table B is used in case of printing with the inks of dark colors only, without using those of light colors. A distribution table C is used in case of printing with the inks of light colors only, without using those of dark colors. In this case there is shown a printing operation of two images by two main scannings with the light-colored ink. In practice, an image density comparable to that printed with the dark-colored ink may be obtained with the light-colored ink only, by recording plural images in superposed manner in plural main scanning operations. The contents of the distribution tables shown in FIG. 1 are shown in FIGS. 3A to 3C. The distribution table A shown in FIG. 3A is used for distributing the printing data of each color, generated in the color processing unit, to the data for the dark-colored ink and those for the light-colored ink, and there are given the output data for the light cyan ink and the dark cyan ink, respectively by a solid line and a chain line, as a function of the input data. As will be apparent from the chart, the light-colored ink only is used until the input data reach a level a, and the light-colored ink and the dark-colored ink are combinedly used beyond said level a. The distribution table B, shown in FIG. 3B, distributes the data of each color, generated in the color processing unit, to the dark-colored ink only, wherein shown are the output data for the dark-cyan ink, by a chain line, as a function of the input data. The distribution table C, shown in FIG. 3C, distributes the data of each color, generated by the color processing unit, only to the light-colored ink, wherein shown are the output data for the dark-cyan ink for a first image, by a solid line, and the output data for the dark-cyan ink for a second image, by a double-dotted chain line, both as a function of the input data. As will be apparent from this chart, the first image alone is printed until the input data reach a level a, and the first and second images are superposedly printed beyond said level a to form the image of the high density area.

The table selection shown in FIG. 1 automatically selects the tables A to C by a sequence shown in FIG. 2, to be executed by a control unit 200 shown in FIG. 8. In the sequence shown in FIG. 2, the detection of the remaining ink amount is executed for all the colors, for example at the completion of printing of a page. For example, if the light-cyan ink is less than a predetermined remaining amount, there is selected, only for the cyan color, a distribution table for printing with the dark-colored ink only without the light-colored ink, thereby preventing the lack of printing in low cyan density areas and thus obtaining a satisfactory image. Also if the dark-cyan ink is less than the predetermined remaining amount, there is selected, only for the cyan color, the distribution table for printing with the light-colored ink only without the dark-colored ink and there is also adopted the superposed recording methods by plural main scannings, thereby preventing the failure of printing of the high density areas and thus obtaining a satisfactory image.

In the above-explained example, in case either of the dark and light cyan inks is exhausted, the distribution table for using the other remaining ink only is selected for the cyan color only, but there is preferably selected the same distribution table for all the colors.

Also each of the distribution tables A to C may be composed of a single table for distributing the dark- and light-colored inks in the same manner for all the colors, or may be composed of plural different tables respectively corresponding to the colors and providing optimum distributions thereto.

Also in the present embodiment the distribution tables are automatically selected according to the detection of the ink remaining amounts, but there may be provided a switch for selecting the distribution tables for arbitrary selection by the user.

Also the selection of the distribution tables may be changed not necessarily at the completion of printing of a page but at any predetermined timing such as at the completion of printing of a line.

Furthermore, the distribution table explained above is designed for printing with two inks of higher and lower densities for each color, but it may also be designed for printing with three inks of high, medium and low densities or with an even larger number of kinds of ink.

Also in the present embodiment, the failure in the stable ink discharge in at least one among plural inks is judged from the low remaining ink amount, but it may also be detected by another factor not related to the low remaining amount, such as the failure in the ink discharge resulting from the clogging of the ink discharge openings.

As explained in the foregoing, the ink jet recording apparatus of the present invention for printing with inks of higher and lower densities for each color comprises, in addition to the distribution table for distributing the density signals of C, M, Y, Bk colors to the density signals for printing with the inks of higher density and those for printing with the inks of lower density, a distribution table for distributing said density signals only to the inks of higher density, a distribution table for distributing said density signals only to the inks of lower density, and means for selecting said distribution tables, thereby enabling to obtain a normal image even when the ink of higher or lower density is exhausted or becomes not discharged properly.

Embodiment 2

In the following there will be explained an embodiment 2 of the present invention, in which the distribution tables are selected not by the stability of ink discharge but according to the density distribution of the image.

The output image of a page is scanned in advance for detecting the density distribution of the image data, and, if the density distribution is concentrated in a high density region, the aforementioned distribution table B (FIG. 3B) is selected to effect the printing with the dark-colored inks only. On the other hand, if the density distribution is concentrated in a low density region, the aforementioned distribution table C (FIG. 3C) is selected to effect the printing with the light-colored inks only.

The density distribution may be detected among the developed image data of a predetermined amount, or, in case of a copying apparatus or the like, by scanning of the original image.

This embodiment, utilizing the detection of the density distribution of the image data, allows to obtain a uniform image without the granularity resulting from the printing with the dark-colored ink in the vicinity of a density level where the dark- and light-colored inks are switched.

Embodiment 3

Figure 11A:
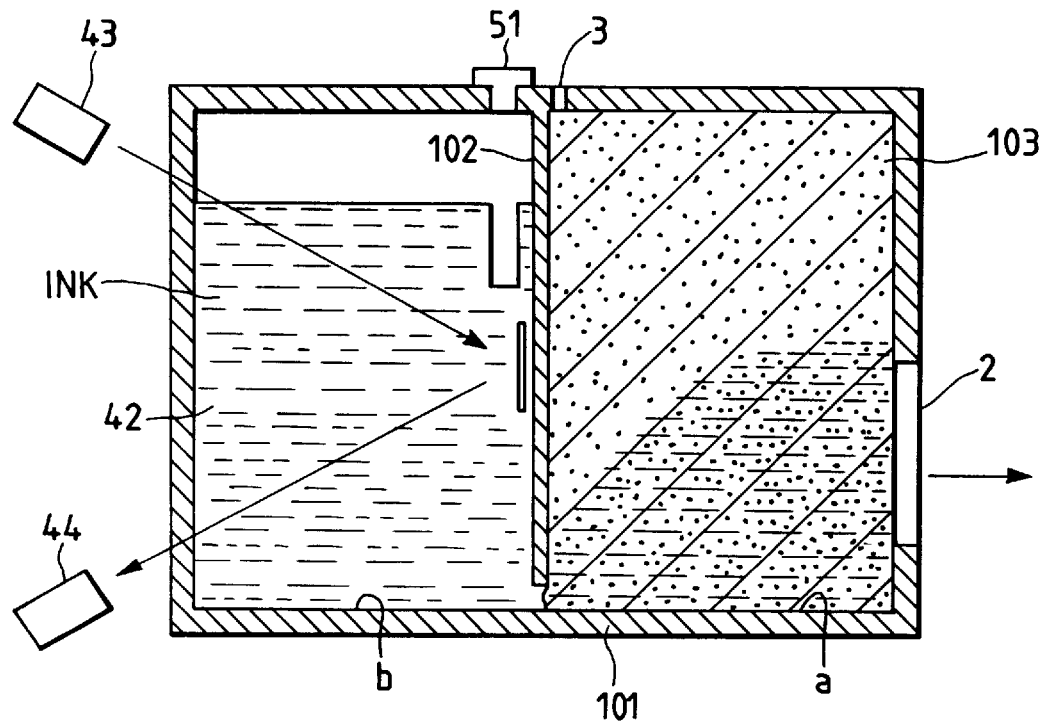
FIGS. 11A and 11B are views showing the detection of the remaining ink amount in an embodiment.
Figure 11B:
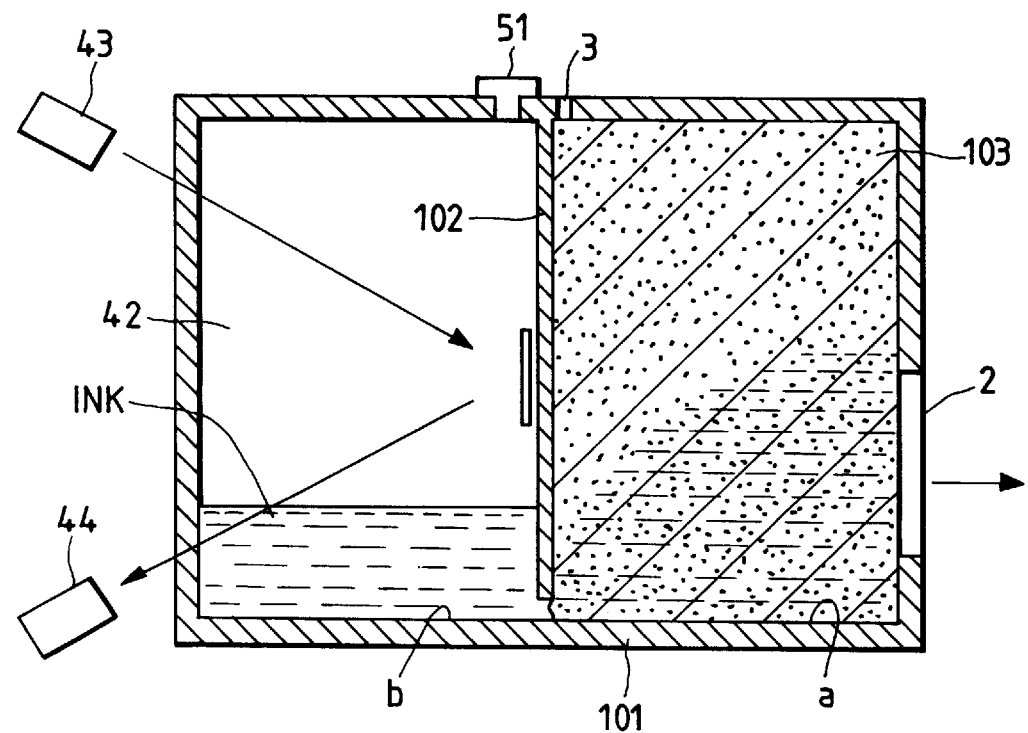

In the following there will be explained an embodiment 3 of the present invention, in which, as shown in FIGS. 11A and 11B, the tank walls 101 are composed of a transparent or semitransparent material whereby optical detection of the remaining ink amount is rendered possible. In this case, there are provided, on a wall in the ink chamber b, a reflecting plate 42 such as a mirror, and, outside the tank, a photosensor consisting of a light-emitting element 43 and a photosensor 44. Said light-emitting element 43 and photosensor 44 may be provided on the carriage or in the home position where the recovery system is provided.

In the configuration shown in FIGS. 11A and 11B, the light-emitting element 43 emits the light at a certain angle, and the photosensor 44 receives the light reflected by the reflecting plate. For example, the light-emitting element 43 is composed of an LED, and the photosensor 44 is composed of a phototransistor. FIG. 11A shows a state in which the ink is fully present, and the light from the light-emitting element 43 is intercepted by the ink and scarcely reaches the photosensor 44 so that the detection output thereof is small. However, when the ink is consumed to a state shown in FIG. 11B, the light from the light-emitting element 43 is scarcely intercepted so that the detection output of the photosensor becomes higher.

Figure 12:
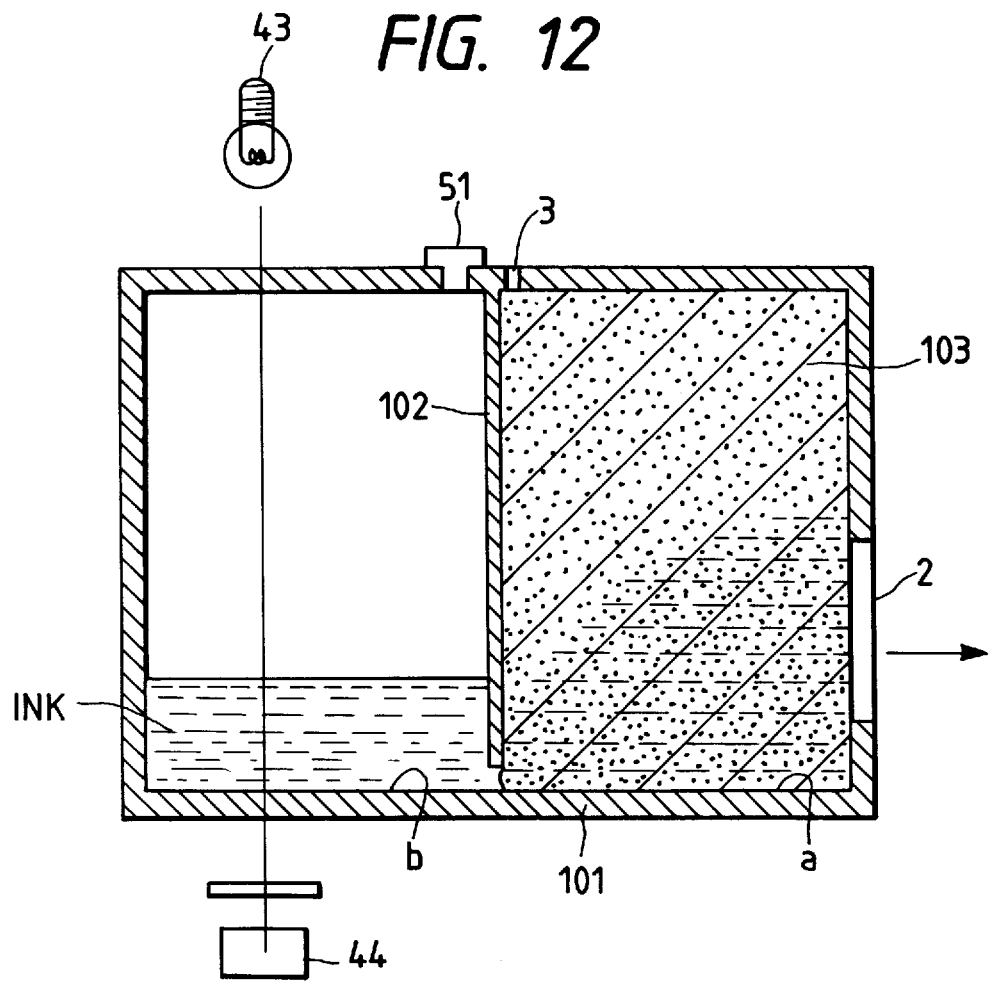
FIG. 12 is a view showing an example of the detection of the remaining ink amount.

FIG. 12 shows a variation in which the light-emitting element and the photosensor are positioned mutually opposite across the ink tank. Also in this case the ink chamber b is composed of a transparent or semitransparent material. This configuration can dispense with the reflecting plate, and also can improve the detection sensitivity since the light is directly received.

The above-mentioned configurations of the detection means for the remaining ink amount allow to obtain the detection output from the photosensor 44 in the form of an analog signal. Consequently, in a color ink jet recording apparatus employing two inks of higher and lower densities for each of C, M, Y and Bk colors, it is rendered possible to use up the inks of higher and lower densities almost at the same time, by providing plural distribution tables corresponding to the differences between the detection outputs of the inks of higher and lower densities of each color and suitably selecting said distribution tables.

In the structures shown in FIG. 11A, 11B and 12, the ink chamber b is maintained at a reduced pressure.

Embodiment 4

In the following there will be explained an embodiment 4 of the present invention.

Figure 13:
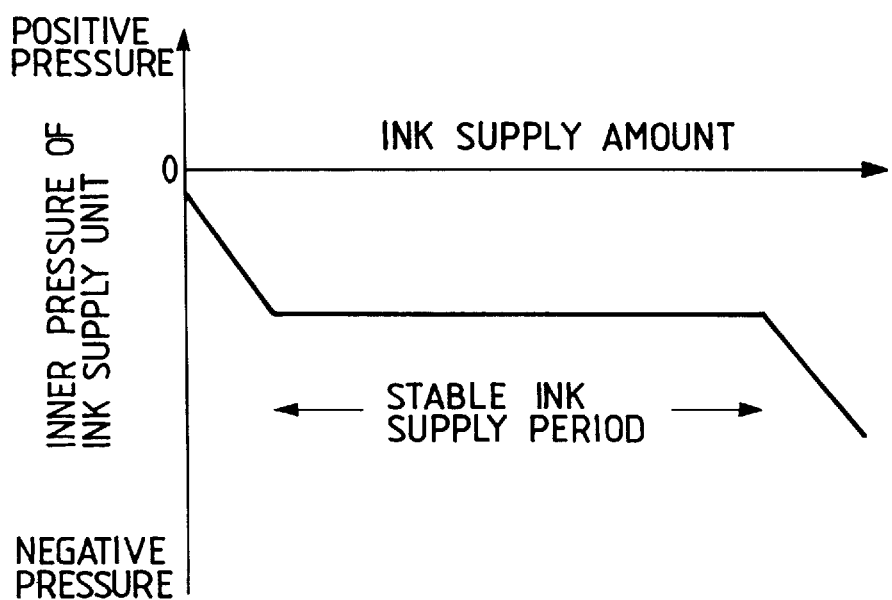
FIG. 13 is a chart showing the variation in the internal pressure in the ink supply unit.

FIG. 13 shows the variation in the internal pressure in the ink supply unit, according to the ink supply amount in an ink tank as shown in FIG. 1. In an initial state of recording, a small amount of ink is present in the ink chamber a, and a negative pressure is generated by the capillary force of the compressed ink absorbent member. As the ink amount in the ink chamber a becomes less by the ink supply, the negative pressure in said ink chamber a, generated by the capillary force determined by the compression rate (pore size distribution) of the compressed absorbent member, gradually increases.

As the ink is consumed more, the ink distribution in the ink chamber a becomes stabilized, and the internal pressure remains thereafter substantially constant, by the introduction of air into the ink chamber b (stable ink supply period).

When the ink in the ink chamber b is exhausted by further ink consumption, the ink in the chamber a starts to be consumed again, so that the negative pressure in the chamber a is changed. The stable ink discharge becomes no longer obtained when the negative pressure in the ink chamber a exceeds a certain value. It is therefore possible to detect the remaining ink amount by the negative pressure in the ink chamber, and to switch the distribution table upon detection of a state where the stable ink discharge becomes no longer possible, thereby preventing the deterioration of the image resulting from the unstable ink discharge.

The present invention is not limited to the foregoing first to fourth embodiments, but is widely applicable to the ink jet recording apparatus for recording with plural inks of different densities.

In the following there will be explained an embodiment in which the density is regulated by employing high-density ink and clear ink.

Figure 14:
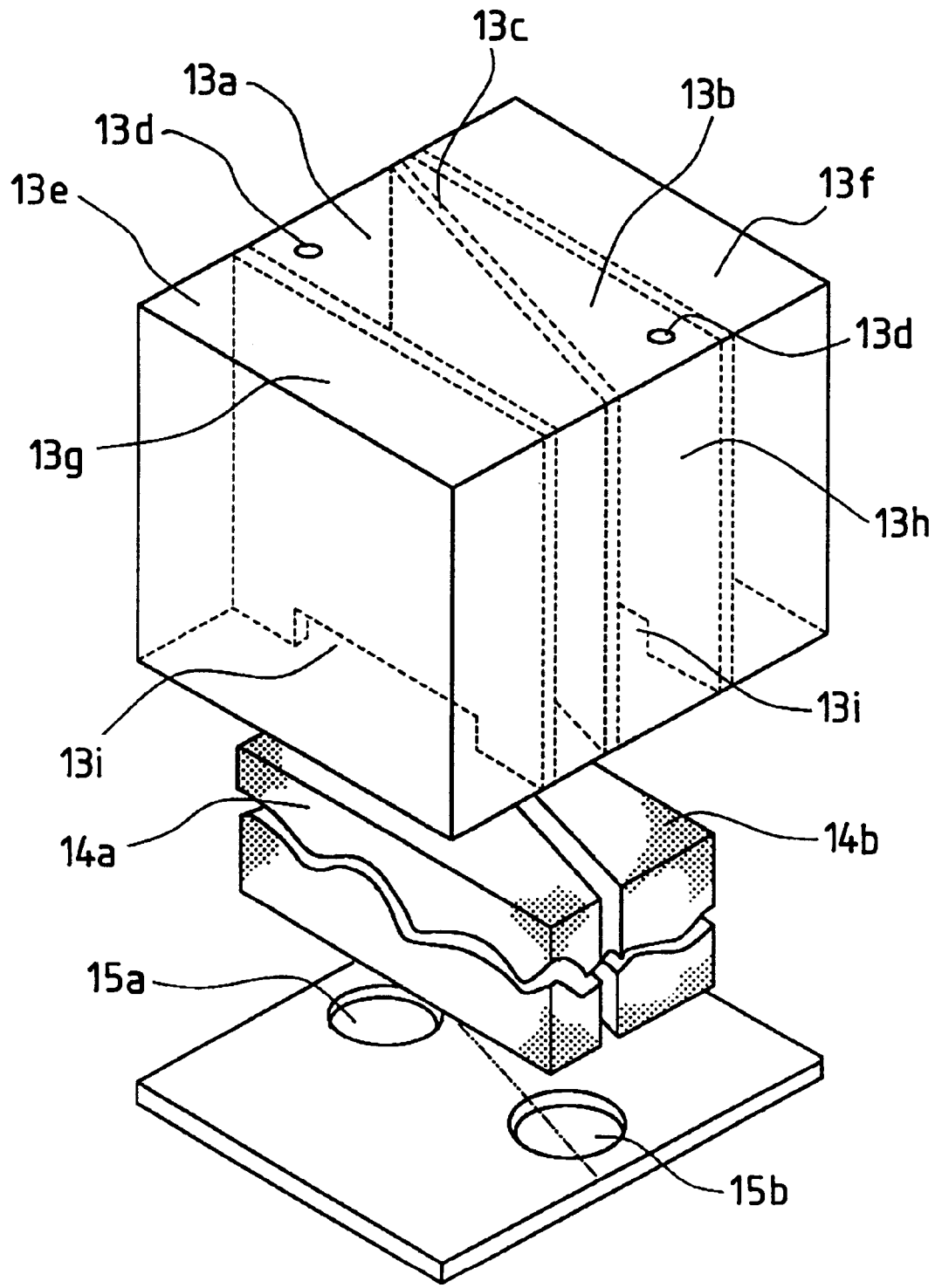
FIG. 14 is a view of an ink tank for forming light and dark ink by ink mixing in the head.

FIG. 14 is a schematic exploded perspective view of an ink tank with improved efficiency of ink use, wherein the ink tank is divided by a partition 13c into an ink chamber 13a for dark ink and an ink chamber 13b for clear ink (dye-free ink consisting solely of solvent), and the color density is regulated according to the area ratio of ink supply apertures 15a, 15b. Said ink chambers 13a, 13b for the dark ink and the clear ink are used as negative pressure generating chambers, and there are further provided ink containers 13e, 13f which are separated from said negative pressure generating chambers by partitions 13g, 13h having apertures 13i at the bottom. After the inks in negative pressure generating members 14a, 14b are used, the inks are supplied from the ink containers 13e, 13f, whereby the ink supply pressure is maintained at a constant head pressure, and uniform ink supply thus made possible. The ink chambers are provided with air communicating holes 13d.

In the ink tank explained above, the area ratio of the supply apertures of the ink tank is regulated respectively according to the darker and lighter colors of the recording heads by the partition provided in the tank, and the divided chambers are respectively filled with the dense-colored ink and the clear ink. When said ink tank is connected to the recording head, said inks flow into said recording head with a ratio determined by said area ratio of the apertures and are mixed in the recording head, thereby providing the ink of an intermediate density. When the clear ink is exhausted, the ink of the lower density becomes no longer discharged, so that the proper image can no longer be obtained. Consequently the remaining amount of the clear ink is detected, and the ink distribution table is switched when the clear ink is exhausted, whereby a proper image can be obtained until the ink of each color is used up.

In the foregoing explanation, the two chambers are respectively filled with the ink of each color and the clear ink, but they may be replaced by the inks of different densities of a same color. In such case the remaining ink amount is detected for both inks, and the ink distribution table is switched according to the result of said detection, whereby all the inks in the ink tank can be used up while the proper image recording is maintained all the time.

As detailedly explained in the foregoing, the present invention, in recording on a recording medium by ink discharge from the discharge openings of a recording head employing plural inks of different densities of a same color, allows to obtain a proper image even when the stable ink discharge becomes difficult in-at least one of said plural inks, by effecting the recording operation by the remaining ink.

Embodiment 5

In the following there will be explained an embodiment 5 of the present invention, with reference to the attached drawings.

Figure 16:
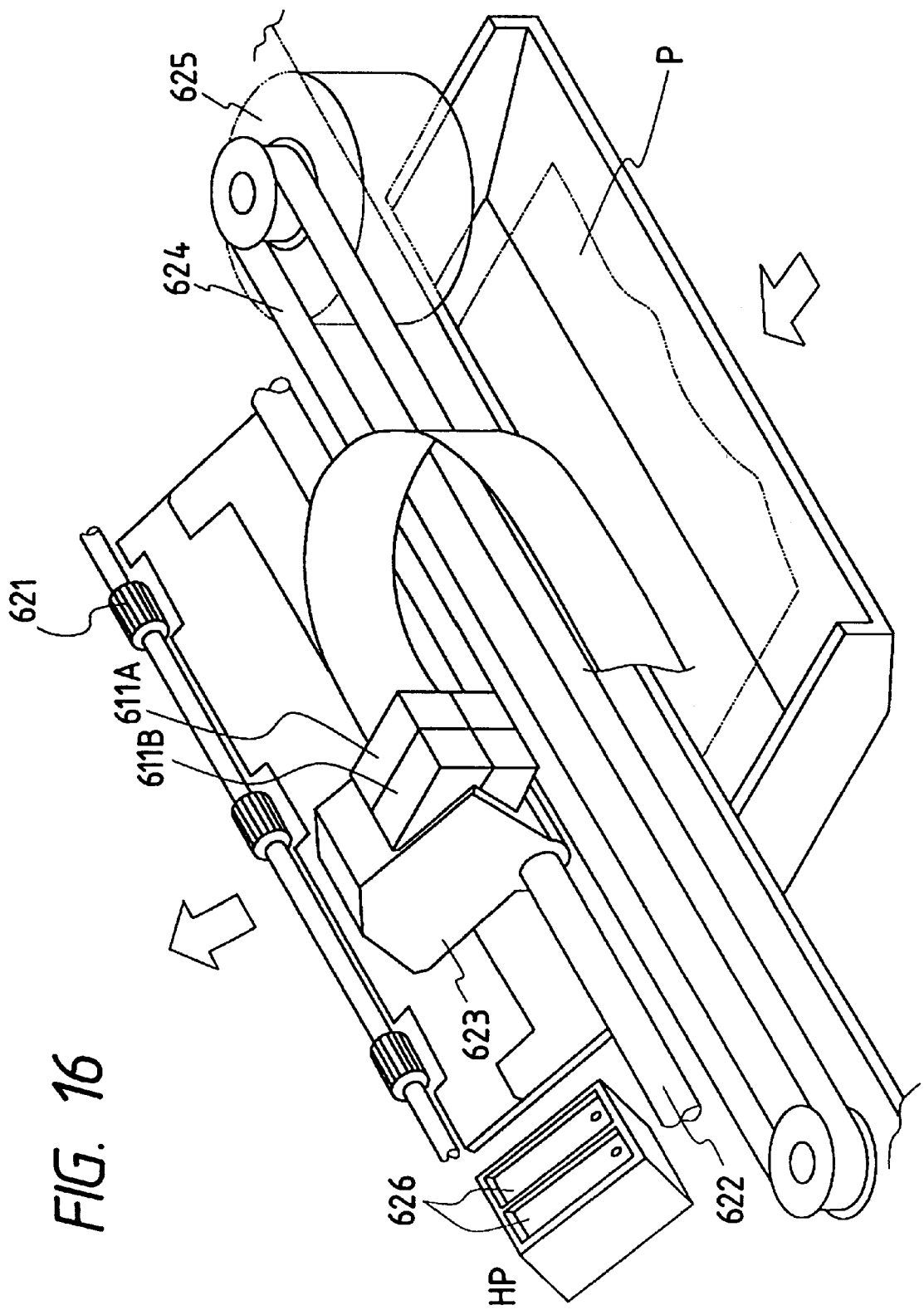
FIG. 16 is a schematic view of an ink jet recording apparatus in which the present invention is applicable.

FIG. 16 is a perspective view of the principal part of a color ink jet recording apparatus embodying the present invention.

On a carriage 623, there are provided, in parallel manner, an ink jet unit 611A having an array of discharge openings for the ink of dark color, and an ink jet unit 611B having an array of discharge openings for the ink of light color.

A recording material P such as paper or a thin plastic sheet, advanced by transport rollers (not shown), is pinched by discharge rollers 621 and is advanced as indicated by an arrow, by means of an unrepresented transport motor.

The carriage 623 is guided and supported by a guide shaft 622 and an encoder (not shown).

The carriage 623 reciprocates along the guide shaft 622, by means of a driving belt 624 driven by a carriage motor 625.

In the interior (liquid path) of each ink discharge opening of said ink jet unit, there is provided a heat-generating element (electrothermal energy converting member) for generating thermal energy for ink discharge.

An image is formed by driving said heat-generating elements based on the recording signal, according to the timings read by the encoder (not shown), thereby discharging and depositing ink droplets onto said recording material P in the order of the dark-colored ink and the light-colored ink.

In a home position (HP) of the carriage selected outside the recording area, there is provided a recovery unit having a capping unit 626. When the recording operation is not executed, the carriage 623 is moved to the home position (HP) and the caps of the capping unit 626 tightly close the faces, having the discharge openings, of the corresponding ink Jet units, thereby preventing the clogging of the ink discharge openings, resulting from the ink deposition caused by evaporation of the ink solvent or from the dust deposition.

The capping function of said capping unit 626 is also utilized in the preliminary discharge mode, in which the ink discharge is executed from the ink discharge openings to the capping unit 626 in a separated state, in order to resolve the discharge failure or clogging in the discharge openings of lower frequency of recording, and in the ink discharge recovery operation in which an unrepresented pump is activated in the capped state to suck the ink forcedly from the ink discharge openings thereby restoring the discharge openings with discharge failure. Also adjacent to the capping unit 626, there may be provided a blade or a wiping member for cleaning the face, having the ink discharge openings, of the ink jet unit.

Figure 17:
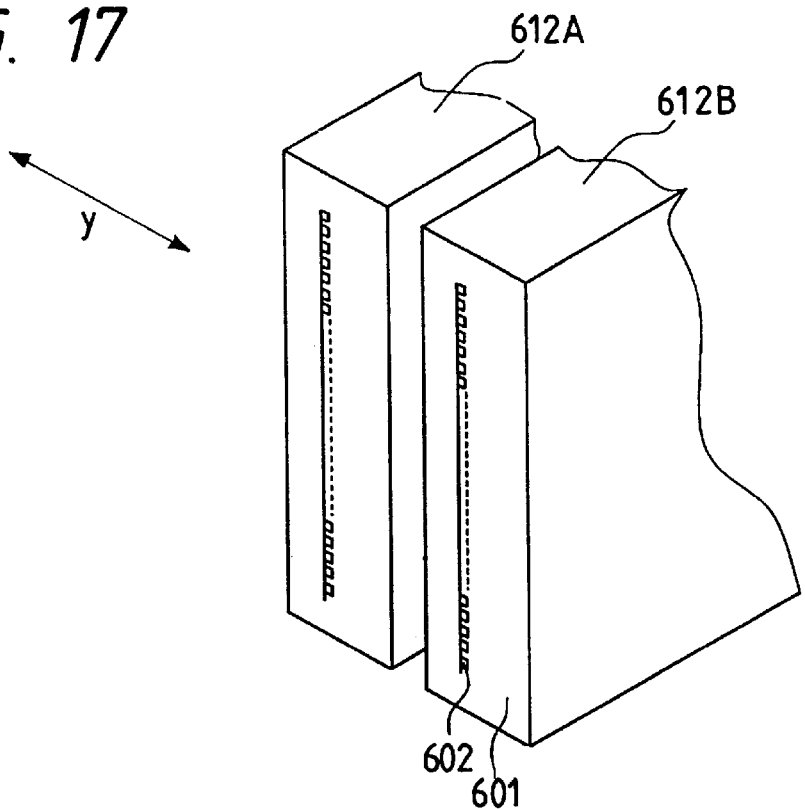
FIG. 17 is a schematic perspective view of recording heads.
Figure 18:
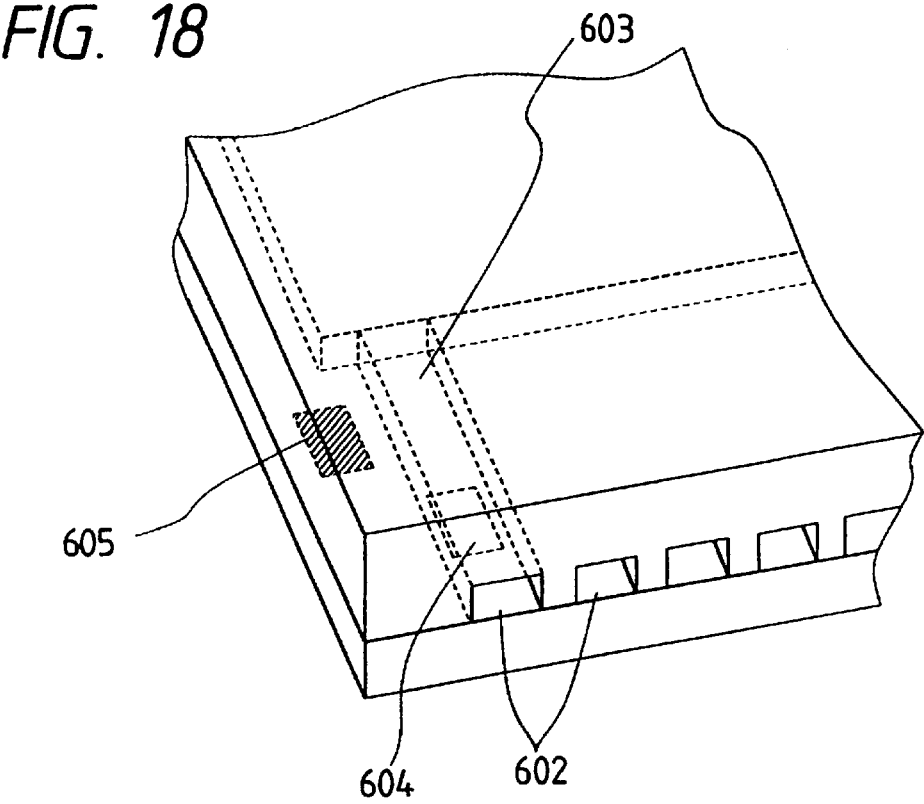
FIG. 18 is a schematic perspective view showing the structure of the ink discharge portion of the recording head.

FIG. 17 is a schematic perspective view of the arrays of the ink discharge openings of the recording heads 612, seen from the side of the recording material, and FIG. 18 is a partial perspective view, schematically showing the structure of the ink discharge part. Referring to FIGS. 17 and 18, a head 612A for the dark-colored ink and a head 612B for the light-colored ink are provided in parallel manner, and each head is provided with an orifice face 601 containing plural discharge openings 602. In a liquid path 602 communicating with each discharge opening 602, there is provided a discharge energy generating element 604 for generating energy required for the ink discharge. An arrow y in FIG. 17 indicates the scanning direction of the carriage 623. In FIG. 18, there is provided a sensor 605 for detecting the temperature of the recording head. In the present embodiment, said sensor 605 is composed of a diode sensor, and is provided at each end of the array of the discharge openings. The kind of the temperature detecting means is not limitative. The temperature may be detected by other sensors such as thermistor, or may be estimated by calculation, based on the duty ratio of the printed dots, in the counting of the number of the printed dots.

Figure 19:
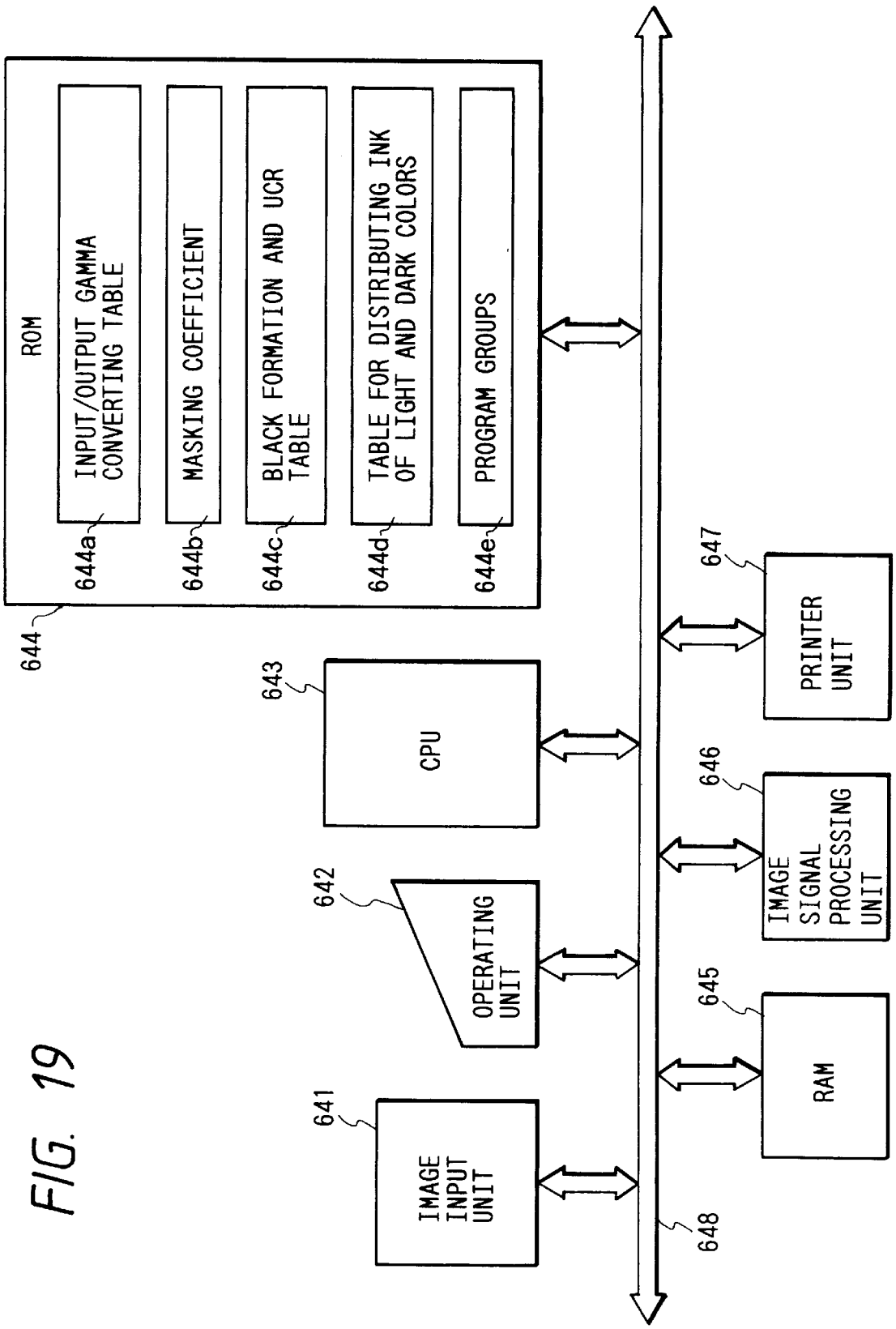
FIG. 19 is a block diagram showing the structure of an ink jet recording apparatus.

FIG. 19 is a block diagram showing the basic configuration of the color ink Jet recording apparatus of the present embodiment.

In FIG. 19, there are shown an image input unit 641 for optically reading the original image for example with a CCD, or for entering image luminance signals (R, G, B signals) for example from a host computer or a video equipment; an operation unit 642 provided with various keys for setting various parameters and for instructing the start of printing operation; and a CPU 643 for controlling the entire recording apparatus according to various programs stored in a ROM.

A ROM 644 stores various programs for operating this recording apparatus, such as a control program and an error process program. More detailedly, said ROM includes an input gamma conversion table 644a to be referred to in the process of an input gamma conversion circuit; masking coefficients 644b to be referred to in the process of a color correction (masking) circuit; a black generation/UCR table 644c to be referred to in the process of a black generation/UCR circuit; a density distribution table 644d to be referred to in the process of a density distribution circuit to be explained later; and programs 644e mentioned above.

There are further shown a RAM 645 to be used as a work area for the programs stored in the ROM and a temporary diversion area in the error processing; a processing unit 646 for the image signal processing to be explained later; a printer unit 647 for forming a dot image, in the recording operation, based on the image signal processed by said signal processing unit; and a bus line 648 for transmitting the address signals, data, control signals etc. within the present apparatus.

Figure 20:
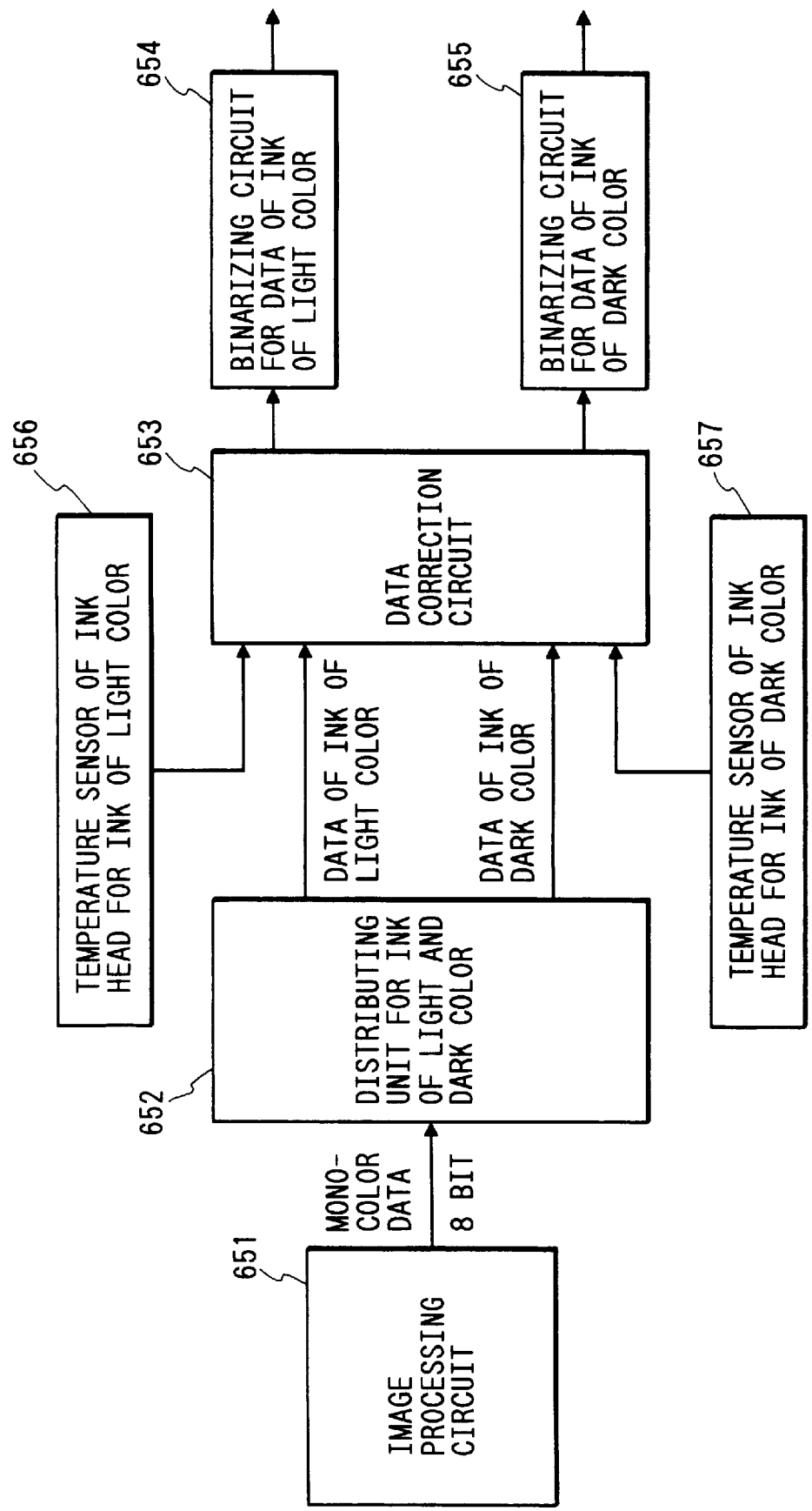
FIG. 20 is a block diagram of an image signal processing unit.

In the following there will be given an explanation on the image signal processing unit. FIG. 20 shows the block diagram of the image signal processing system. An image processing circuit 651 effects masking, UCR (undercolor removal) etc., and any general image processing flow is applicable therein.

The single-color data after color processing are fetched by a density distribution unit 652, which distributes the input data to the data for light-colored ink and those for dark-colored ink, according to the density distribution table 644d in the ROM 644 shown in FIG. 19.

Figure 21:
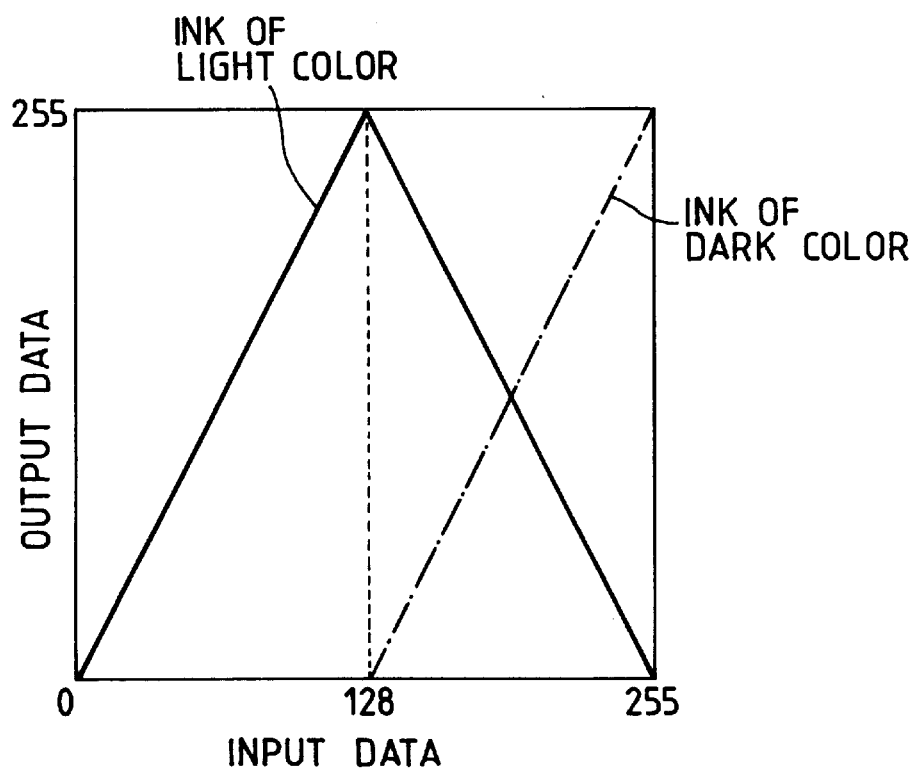
FIG. 21 is a chart showing an example of the conversion graph of the light-dark distribution table.

FIG. 21 shows an example of the conversion graph of the density distribution table, wherein a solid line and a chain line respectively correspond to the data for light-colored ink and those for dark-colored ink. If the 8-bit single-color data are within a range from 0 to 128, there are released the data for dark-colored ink at "0", and those for light-colored ink within a range from "0" to "255". If the single-color data are within a range from 128 to 255, the released data for dark-colored ink is varied from "0" to "255" while those for light-colored ink is varied from "255" to "0".

In short, the recording operation of the present embodiment is conducted principally with the ink of lower dye concentration (light-colored ink) if the input data are low (highlight side), and principally with the ink of higher dye concentration (dark-colored ink) if the input data are high.

However, as explained before, the ink discharge amount in the ink jet recording apparatus is significantly influenced by the temperature of the recording head. The ink discharge amount becomes larger as the ink temperature becomes higher, so that the density of the recorded image varies depending on the temperature of the recording head.

Figure 22:
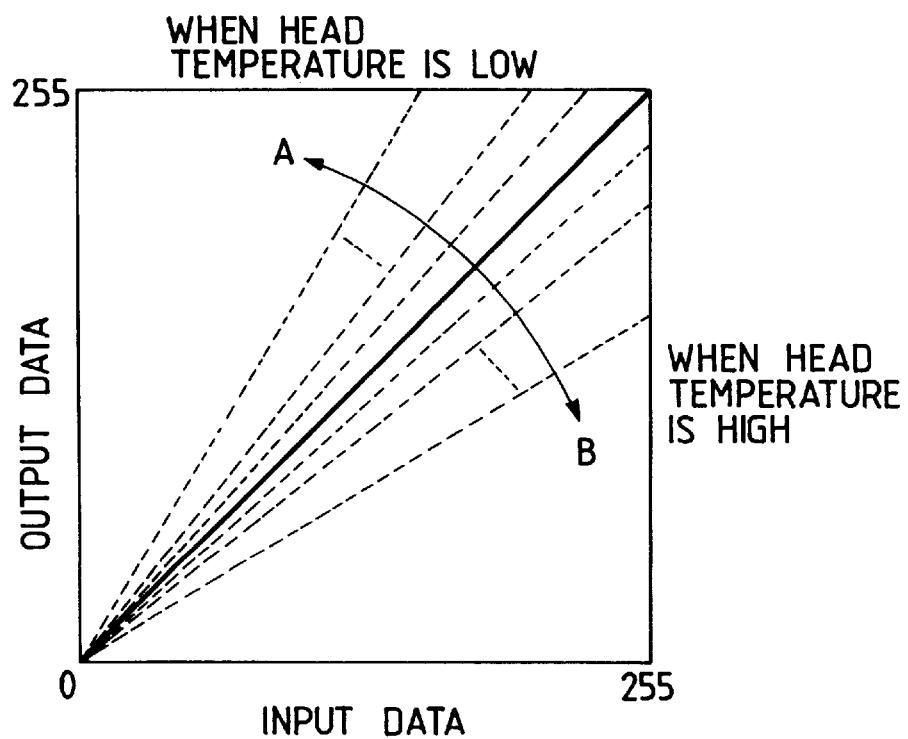
FIG. 22 is a chart showing an example of the conversion graph for data correction.

Consequently, a data correction circuit 653 corrects the data for light-colored ink and those for dark-colored ink distributed by the density distribution table, based on the temperature data obtained from the temperature sensor 656 of the light-colored ink head and the temperature sensor 657 of the dark-colored ink head. FIG. 22 shows an example of the conversion graph for data correction, to be executed by said data correction circuit 653. If the head temperature is low, the graph is shifted to a side A to increase the output data, thereby increasing the density. Also if the heat temperature is high, the graph is shifted to a side B to decrease the output data, thereby reducing the density. The data for the dark- and light-colored inks, thus corrected according to the head temperature, are respectively binarized in the binarizing circuits 654, 655 shown in FIG. 20, and are supplied in the form of on/off data (1-bit signal) to the respective heads.

The foregoing embodiment has been explained by single-colored ink, but the present invention is not limited to such embodiment and is applicable also to a color recording apparatus utilizing inks of higher and lower densities in plural colors such as cyan, magenta, yellow and black. Also the dye concentration of the ink is not limited to two levels of high and low, but may also be selected at three or more levels. This is because, if the dot density is different significantly between the inks of high and lower densities, the tonal rendition does not become linear in a portion where said inks of higher and lower densities are switched and a pseudo contour tends to appear in such portion. Also in such ink switching portion, there may result a variation in the granurality or the hue of the recorded image, thereby giving unnatural impression. For this reason it is preferable to conduct the recording operation with an increased number of ink densities, such as inks of higher, medium and lower densities.

The configuration explained above allows to obtain desired density in the recorded image even when the temperature of the recording head varies, thereby significantly improving the tonal reproducibility.

Embodiment 6

In the following there will be explained an embodiment of the ink jet recording apparatus of the present invention, wherein the ink jet recording head is provided with plural liquid chambers in which the inks of different densities of a same color are supplied for improving the tonal reproducibility.

Figure 23:
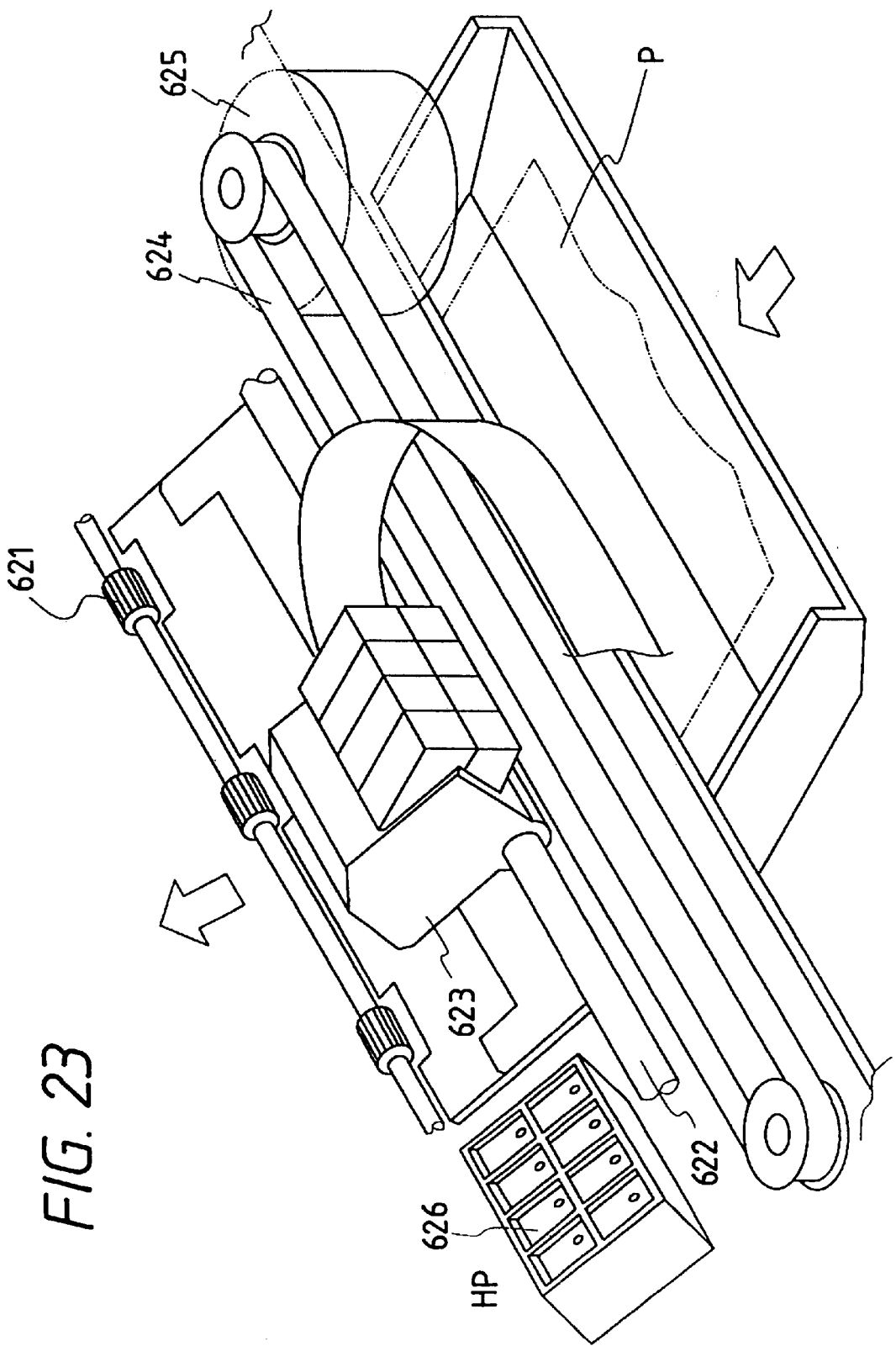
FIG. 23 is a schematic view of an ink jet recording apparatus in which the present invention is applicable.

FIG. 23 is a perspective view of the principal part of the color ink jet recording apparatus of an embodiment 6, wherein the functions are basically same as those of the embodiment 5.

Figure 24:
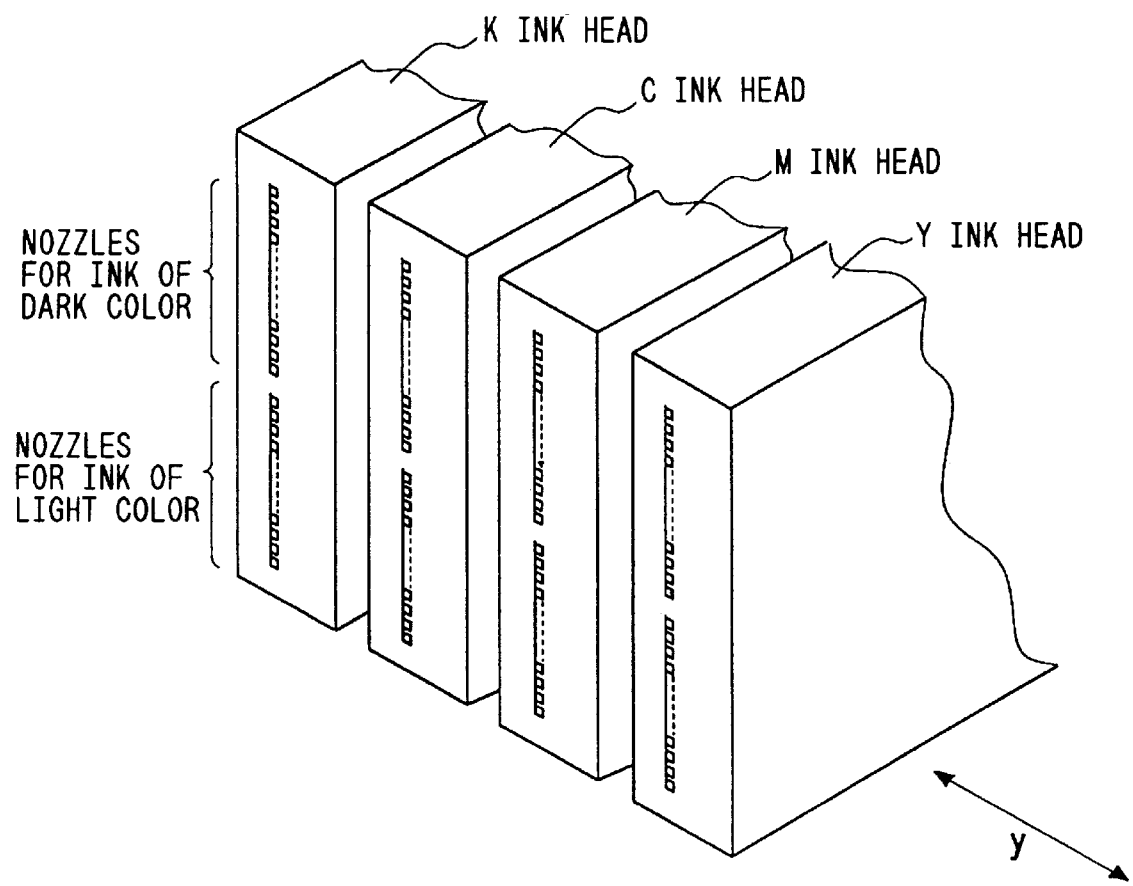
FIG. 24 is a schematic perspective view of recording heads.

FIG. 24 is a schematic perspective view of the arrays of the ink discharge openings on the recording heads in said recording apparatus, seen from the side of the recording material.

The ink jet recording apparatus illustrated in FIG. 23 has the recording heads for the inks of four colors of C (cyan), M (magenta), Y (yellow) and K (black), wherein each of the recording heads, arranged in parallel manner on a carriage 623, is provided with an array of the discharge openings for discharging the ink of dark color, and an array of the discharge openings for discharging the ink of light color.

In the recording operation with the inks of dark and light colores, the aberration in the deposited positions of the dots of the dark and light colors is also important, and the density may vary by such aberration in the dot position. In the present embodiment, the arrays of the discharge openings for the inks of different densities are provided on a single recording head, so that said arrays are relieved from the vertical and horizontal positional aberrations, encountered in case said arrays are provided on different recording heads and the aberration in density scale, resulting from the deposited position can therefore be reduced.

Figure 25:
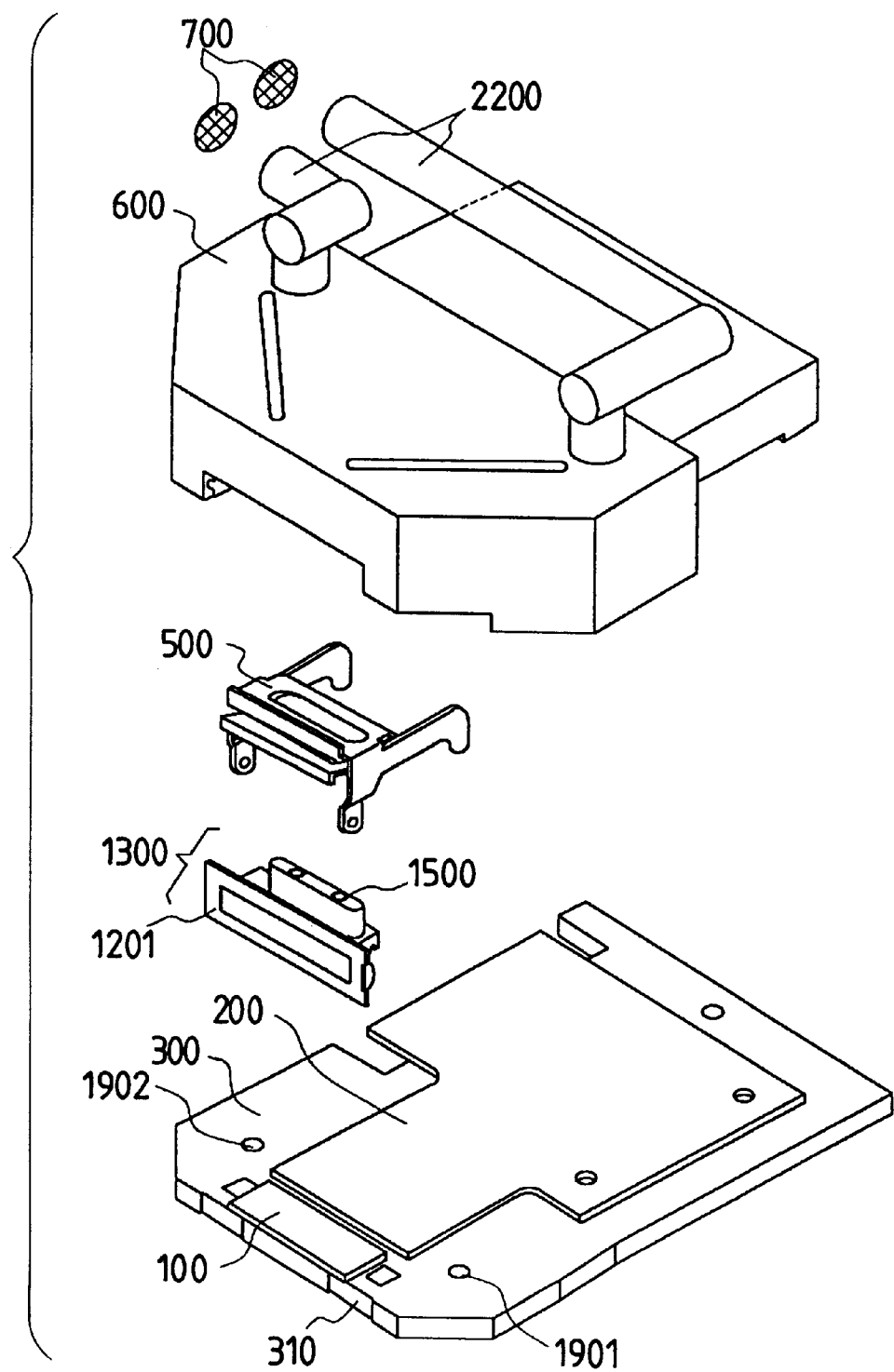
FIG. 25 is a schematic view showing the structure of a recording head.

FIG. 25 is an exploded perspective view of the ink jet recording head to be employed in the present embodiment.

A wiring board 200 is connected, at an end thereof, with the wirings of a heater board 100, and is provided, at the other end, with unrepresented plural pads serving to receive the electrical signals from the main body of the apparatus and respectively corresponding to the electrothermal converting members, whereby said electrical signals from said main body are transmitted to the respective electrothermal converting members.

A metal support member 300, for supporting the rear surface of the wiring board 200 by planar contact, constitutes a base plate of the ink jet unit. A pressure spring 500 is provided, for applying an elastic pressure on a linear area in the vicinity of the ink discharge openings of a grooved ceiling plate 1300, with a portion formed in a substantially U-shaped cross section, claws for engaging with holes formed in the base plate, and a pair of rear legs for receiving the force, applied to the spring, by the base plate. The wiring board 200 and the grooved ceiling plate 1300 are maintained in pressure contact by the force of said spring. The wiring board 200 is adhered to the support member for example by adhesive material.

At an end of an ink supply tube 2200, there is provided a filter 700. An ink supply member 600 is prepared by molding, and the grooved ceiling plate 1300 is integrally provided with an orifice plate 1201 and liquid path 1500 leading to respective ink supply apertures. The ink supply member 600 is fixed to the support member 300 in simple manner by inserting two rear pins (not shown) of the ink supply member 600 into holes 1901, 1902 of the support member and thermally fusing the protruding ends of said pins.

In this state, there is formed a uniform gap between the orifice plate 1201 and the ink supply member 600. A sealing agent is poured from an inlet formed on the upper part of said ink supply member, thereby sealing the bonding wires and the above-mentioned gap between the orifice plate 1201 and the ink supply member 600, and also sealing the gap to the front end of the support member 300.

Figure 26:
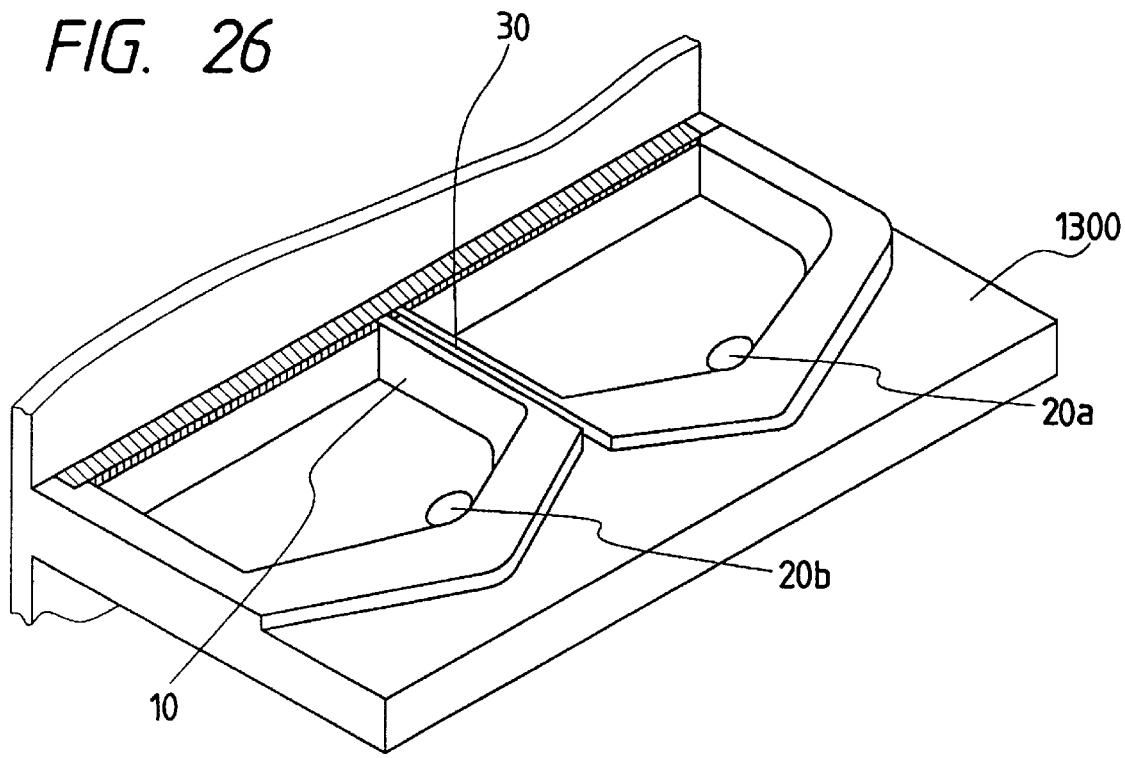
FIG. 26 is a view showing the structure of the grooved ceiling plate.

FIG. 26 is a perspective view of the grooved ceiling plate 1300 of the recording head to be employed in the present embodiment, seen from the side of the heater board 100. There are provided plural liquid chambers, which are mutually separated by partition walls 10, and are respectively provided with ink supply openings 20a, 20b.

Said partition walls 10 are provided, on contact faces with the heater board 100, with grooves 30, which communicate with the external peripheral part of the grooved ceiling plate 1300. After said plate 1300 is maintained in contact with the heater board, said external peripheral part is sealed with the sealing agent as explained above. In this operation, the sealing agent enters along said grooves, thereby filling the gap between said board and the heater board. In this manner, the liquid chambers can be completely separated by the steps known in the conventional head. The structure of said grooves varies according to the physical properties of the sealing agent and has to be shaped corresponding to the sealing agent to be employed. The above-explained structure of separate plural liquid chambers allow to supply different inks to the ink discharge openings.

Figure 27:
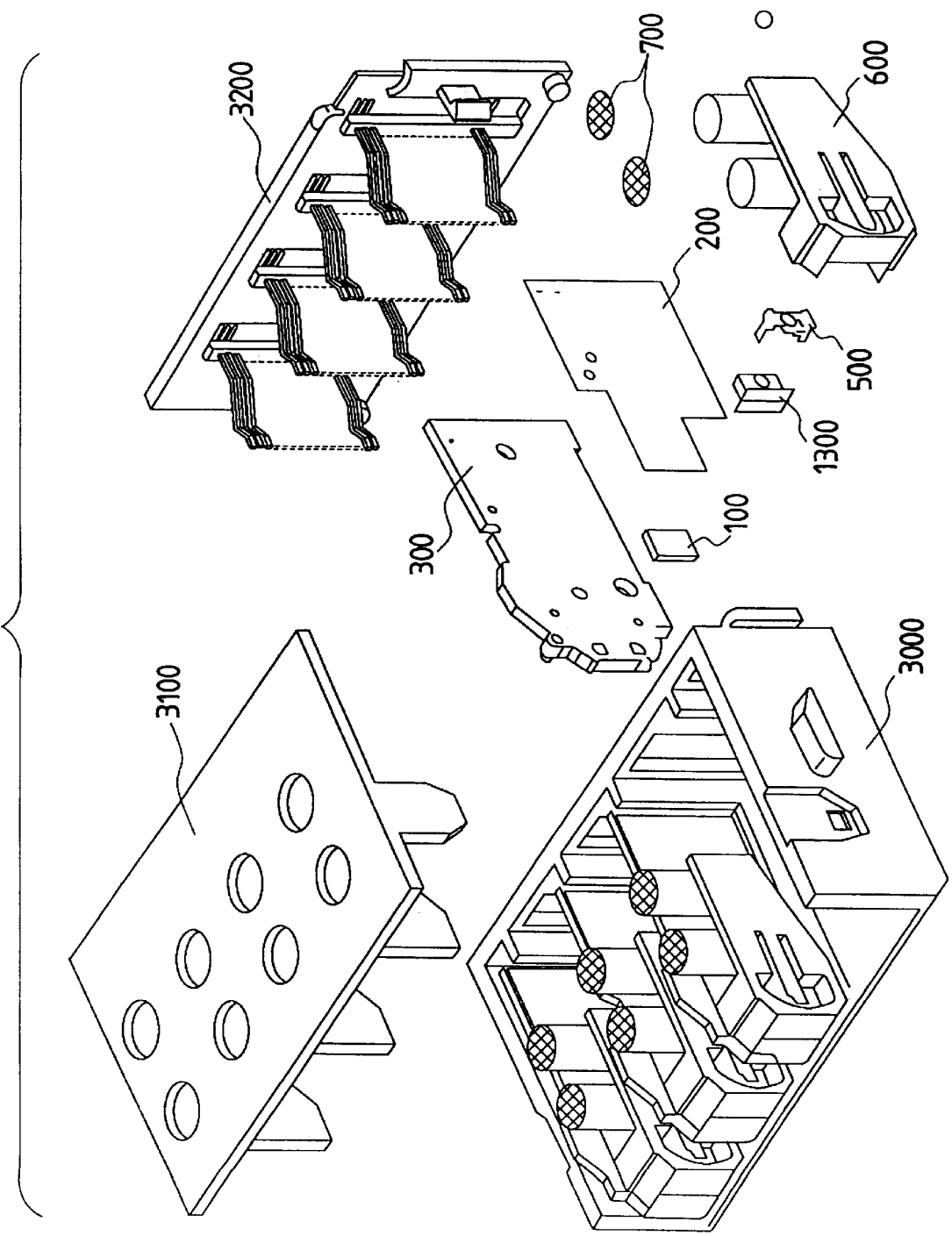
FIG. 27 is a view showing the structure of an ink jet cartridge (IJC) in which four heads are integrated.

FIG. 27 shows the structure of an integral 4-head ink jet cartridge (IJC) in which the recording heads of four colors C, M, Y, K are integrally assembled by a frame 3000. Inside said frame 3000, the four recording heads are mounted with a predetermined mutual distance, and are fixed with the arrays of the ink discharge openings adjusted in the vertical and horizontal positions. There are also shown a frame cover 3100, and a connector 3200 for supplying the pads, provided on the wiring boards 200 of the four recording heads with the electrical signals from the main body of the apparatus.

Figure 28:
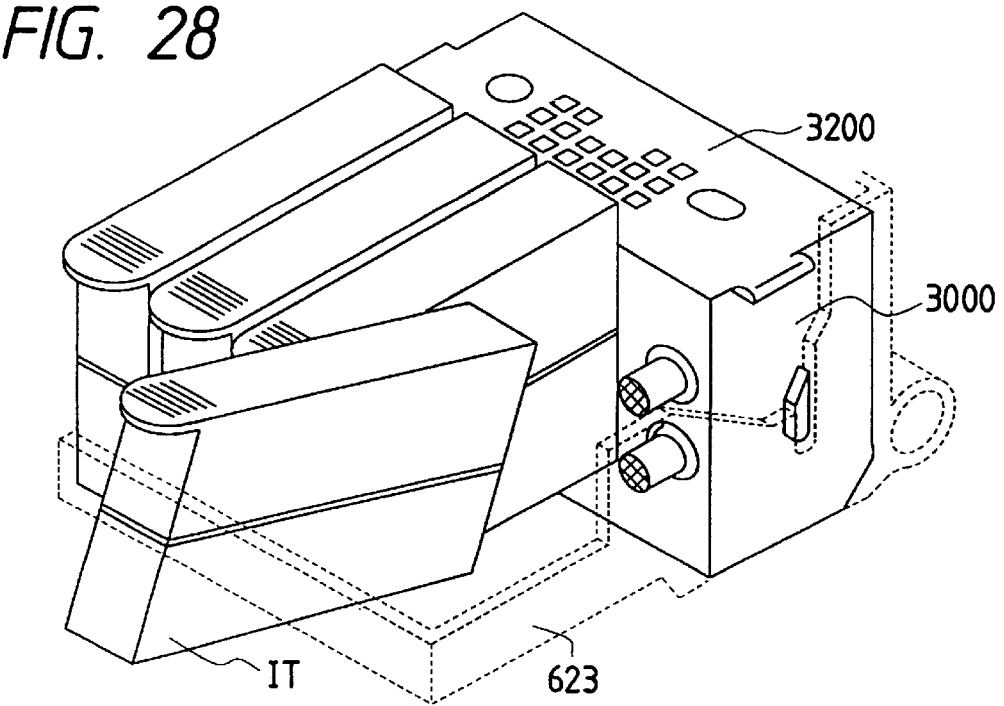
FIG. 28 is a view showing the loading operation of the ink jet cartridge and the ink tank on the carriage.

FIG. 28 shows the state of the integral 4-head ink jet cartridge mounted on the carriage 623. Each ink tank is divided into upper and lower chambers, which are respectively filled with the inks of higher and lower densities. On said carriage, the ink jet cartridge (IJC) and the four ink tanks (IT) of C, M, Y and K colors are coupled by pressurized contact, whereby each ink is supplied from the corresponding ink tank to the recording head.

Also in this embodiment, a diode sensor is provided on the heater board 100 as temperature detection means for the recording heads. As explained in the foregoing, the temperature detection means is not particularly limited to such form, and the temperature may be detected by other detectors such as a thermistor, or may be estimated by calculation from the duty ratio of the printed dots.

Figure 29:
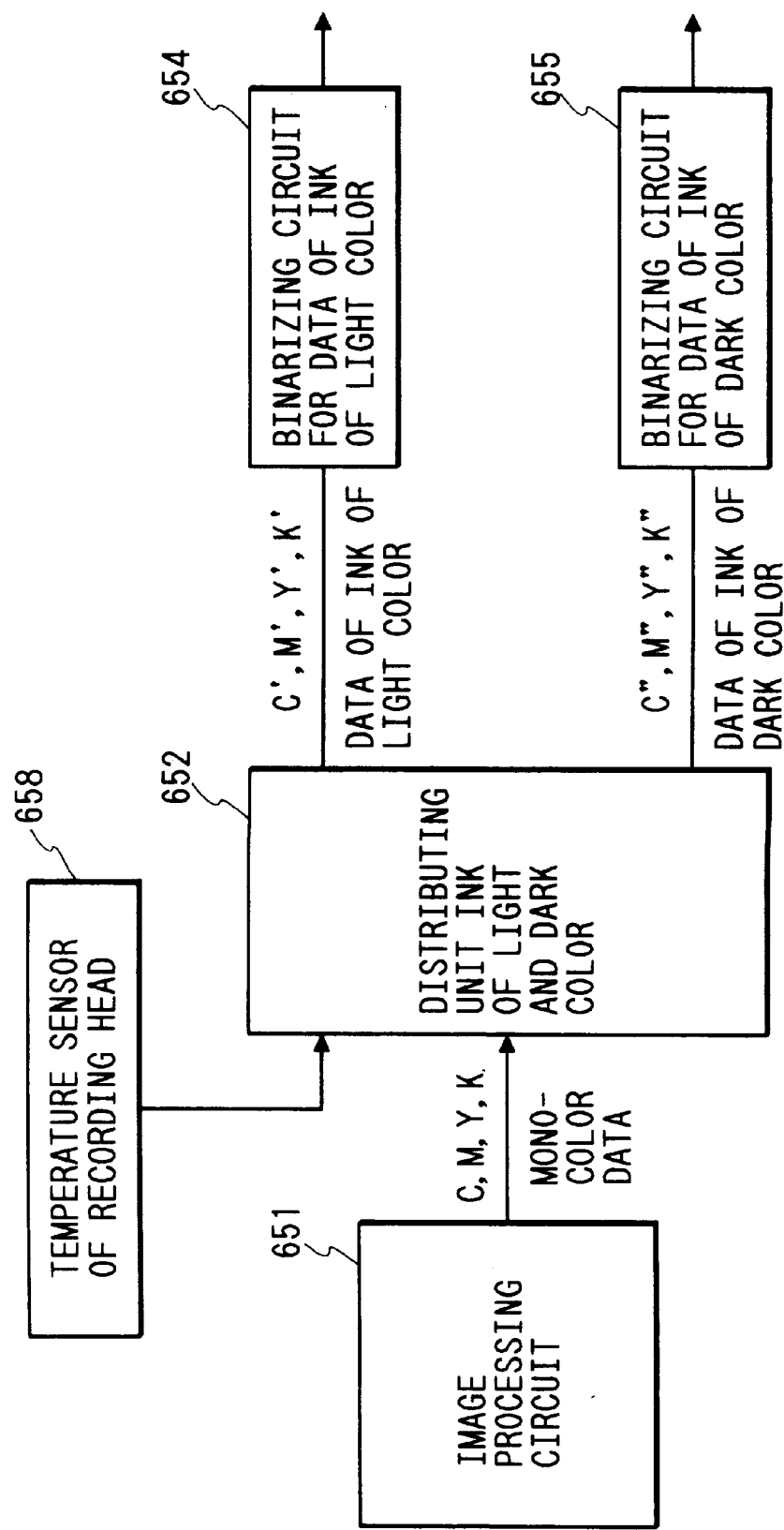
FIG. 29 is a block diagram of an image signal processing unit.

FIG. 29 is a block diagram of the image signal processing system, wherein an image processing circuit 651 includes masking and UCR (undercolor removal), and any commonly used image processing flow is applicable thereto.

The C, M, Y and K data after image processing are fetched by a succeeding density distribution unit 652. In the present embodiment, according to the temperature data from the temperature sensor 658 of the recording head, an optimum one is selected from the plural density distribution tables prepared in advance, and the input data are distributed to the data for the light-colored ink and those for the dark-colored ink, according to thus selected distribution table.

Figure 30A:
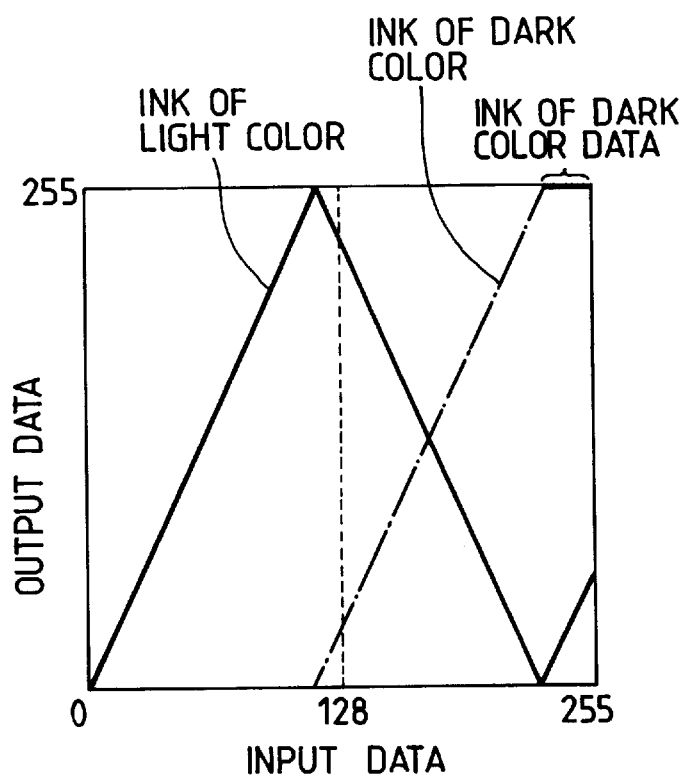
FIGS. 30A and 30B are charts showing an example of the conversion graph of the light-dark distribution table.
Figure 30B:
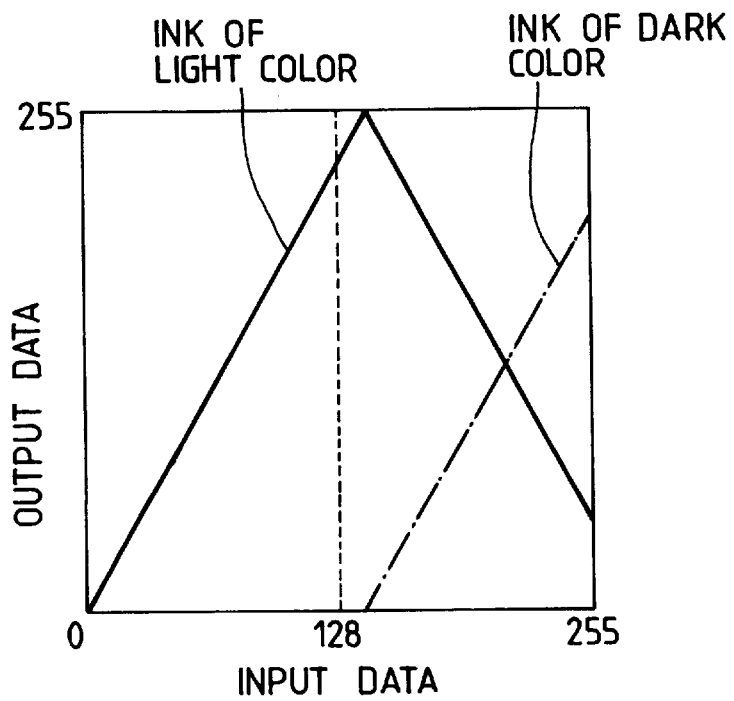

FIG. 30A shows an example of the distribution table for a low head temperature, while FIG. 30B shows an example of the distribution table for a high head temperature.

These examples will be explained in the following, in comparison with the distribution table shown in FIG. 21.

As the discharge amount is low for a low head temperature, the output data for the dark- and light-colored inks are increased for a given input data as shown in FIG. 30A thereby elevating the image density. Since the output data for the dark-colored ink are already saturated in a high level area (around 255) of the input data, the data for the light-colored ink are further added for elevating the image density.

As the discharge amount becomes higher at a high head temperature, the output data are made lower, than in the standard state shown in FIG. 21, for a given input level in order to suppress the image density as shown in FIG. 30B. The switching of the distribution table in this manner according to the temperature of the recording head allows to always obtain a constant image density even in the presence of a temperature-dependent variation in the ink discharge amount, thereby enabling to realize an ink jet recording apparatus with satisfactory tonal rendition.

The method of distribution of the input data into the data of the light-colored ink and those of the dark-colored ink based on the distribution table is same as in the embodiment 5. Based on the distribution table selected according to the temperature of the recording head, the input C, M, Y, K data are distributed into the data for the light-colored inks (C', M', Y', K') and those for the dark-colored inks (C", M", Y", K"), which are respectively binarized by binarizing circuits 654, 655 shown in FIG. 29 and are supplied, in the form of on/off data (1-bit signals) to the respective recording heads.

The present embodiment also enables to always reproduce a constant tonal density rendition regardless of the temperature of the recording heads, and can simplify the process by averaging the temperatures of the recording heads for the light- and dark-colored inks.

However, in case the inks of different densities are dividedly used within a recording head, as in the present embodiment, the temperatures of the heads for the light- and dark-colored inks may become not considerable as an average when the number of the discharge openings increases. In such case, the distributed data for each ink may be corrected according to the temperature detected independently in each ink area. Also the recording head, which is internally divided into plural ink areas as in the present embodiment, may be combined with the image signal processing system employed in the embodiment 5, in which the data for the dark- and light-colored inks distributed by a distribution table are corrected according to the head temperature.

The configuration containing the arrays of the discharge openings for the inks of different densities within a single head enables to limit the number of recording heads, thereby achieving compactization of the apparatus.

The foregoing embodiment has been explained by a 4-color ink Jet recording apparatus employing cyan, magenta, yellow and black colors, but the number of colors is not limited to such embodiment and the present invention is likewise applicable to a recording apparatus employing the inks of different densities of a single color or plural colors of a different number. Also the dye concentration of the ink is not limited to two levels of high and low, but may be selected in three or more levels. If the dot density is significantly different between the inks of high and low densities, the tonal reproduction does not become linear in a portion where the inks of high and low densities are switched, and there may easily result a pseudo contour. Also in such ink switching portion, there may result a variation in the granularity or in the hue of the recorded image, thus giving an unnatural impression. It is therefore preferable to effect the recording operation with an increased number of densities of the ink, for example low, medium and high densities.

Other Embodiments

For controlling the ink discharge amount of the ink jet recording head, there has been proposed the PWM (pulse width modulation) control. Said PWM control method will be explained in detail in the following, with reference to the attached drawings. FIG. 31 is a view for explaining the divided pulses, wherein Vop indicates a driving voltage; P1 indicates the pulse width of an initial pulse (hereinafter called pre-pulse) of divided plural heating pulses; P2 is an interval time; and P3 is the pulse width of a second pulse (hereinafter called main pulse). T1, T2 or T3 indicates the time for defining P1, P2 or P3. The driving voltage Vop is a factor determining the electric energy required for generating the thermal energy by the electrothermal converting element provided in the ink path, and is determined by the area, resistance and film structure of said electrothermal converting element and by the structure of the ink flow path. There stand relationships P1=T1, P2=T2−T1 and P3=T3−T2.

The PWM control of the present embodiment may also be named as pre-pulse width modulation control, in which, for the discharge of an ink droplet, the pulses are given in succession with widths P1, P2 and P3, and the width of the pre-pulse is modulated according to the temperature of the recording head or of the ink. Said pre-pulse is used principally for controlling the ink temperature in the liquid path, and has an important role in the discharge amount control. The width of said pre-pulse is preferably selected at such level as not to form a bubble in the ink,, by the energy generated by the electrothermal converting element in response to said pre-pulse. The interval time is to secure a time for transmission of the energy, generated by said pre-pulse, to the ink in the liquid path. The main pulse serves to generate a bubble in the ink present in the liquid path, thereby discharging the ink from the discharge opening, and its width is preferably determined according to the area, resistance and film structure of the electrothermal converting member and the structure of the liquid path.

Figure 32:
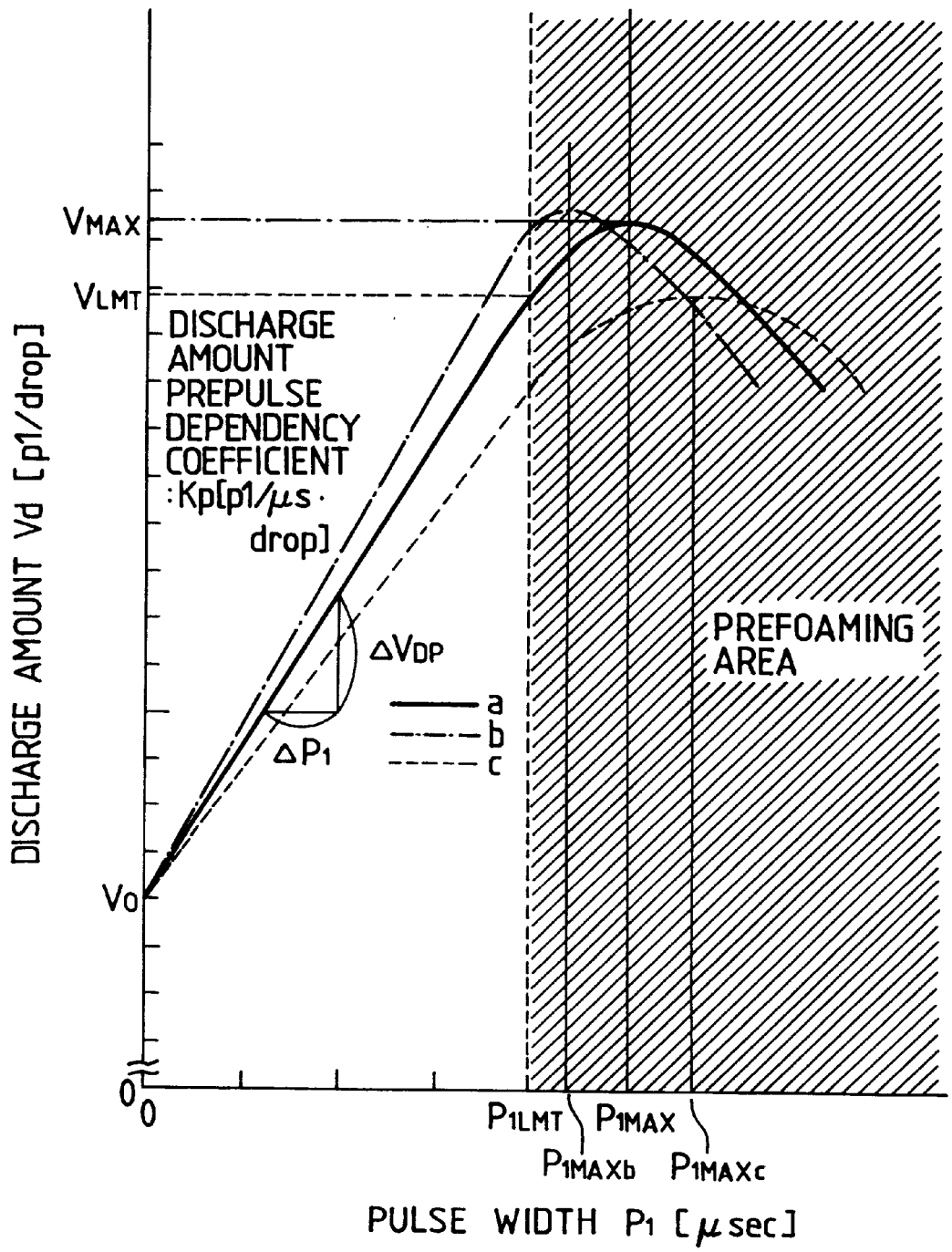
FIG. 32 is a chart showing the dependence of the ink discharge amount on the prepulses.

FIG. 32 is a chart showing the dependence of the discharge amount on the width of the pre-pulse, wherein V0 indicates the discharge amount at P1=0, which is determined by the head structure.

As indicated by a curve a in FIG. 32, in response to the increase of the width P1 of the pre-pulse, the discharge amount Vd increases linearly within a range of said width P1 from 0 to P1LMT. Beyond said level P1LMT, the discharge amount loses linearity in the increase, and becomes saturated at a pulse width P1MAX.

The range up to the pulse width P1LMT, in which the discharge amount Vd varies linearly in response to the variation of the pulse width P1, is effective for the discharge amount control by the variation of the pulse width P1.

If the pulse width becomes larger than P1MAX, the discharge amount Vd becomes smaller than the maximum value VMA. This is due to a phenomenon that, by the application of a pre-pulse of a width in the above-mentioned range, small bubbles are formed on the electrothermal converting member and, the next main pulse being applied before said small bubbles vanish, said small bubbles disturb the bubble generation by said main pulse, thereby suppressing the discharge amount. Such range is called pre-bubbling range, in which the discharge amount control by the pre-pulse width becomes difficult. In the range P1−0 to P1LMT in FIG. 32, the slope of the linear portion is defined as the pre-pulse dependence coefficient which is represented by:

$$Kp = \Delta Vop / \Delta P1$$

which is not dependent on the temperature but is determined by the head structure, driving conditions, physical properties of the ink etc. In FIG. 32, curves b, c show the variations in other recording heads, indicating that the discharge characteristics are specific to the recording head.

Figure 33:
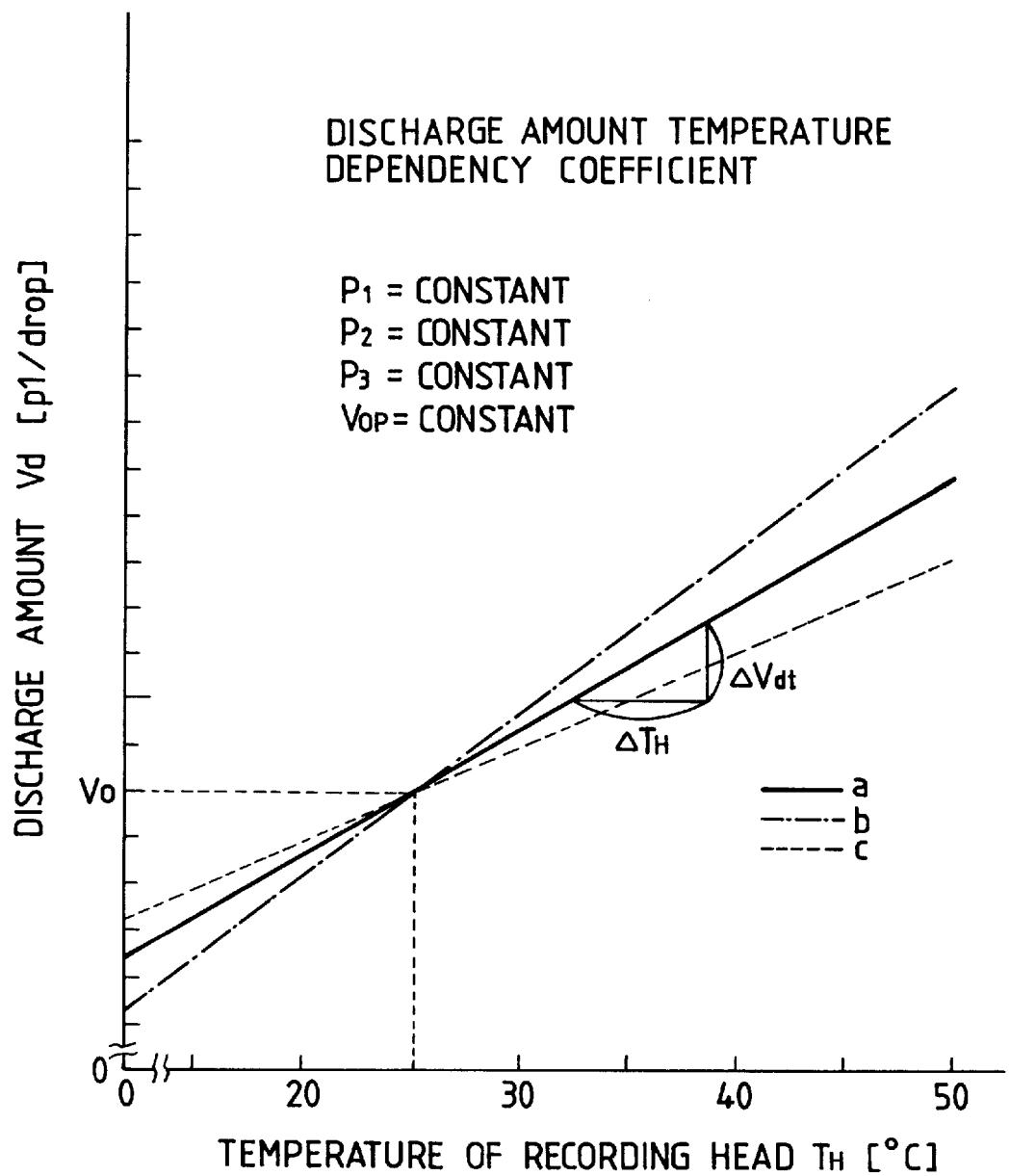
FIG. 33 is a chart showing the dependence of the ink discharge amount on the temperature.

On the other hand, another factor determining the discharge amount of the ink jet recording head is the ink temperature of the discharge part (said temperature being sometimes replaceable by the temperature of the recording head). FIG. 33 shows the temperature dependence of the discharge amount. As indicated by a curve a therein, the discharge amount Vd linearly increases as a function of the temperature TH of the recording head. The slope of said line is defined as the temperature dependence coefficient, which is given by:

$$KT = \Delta Vdt / \Delta TH.$$

This coefficient is independent from the driving conditions but is determined by the head structure, physical properties of the ink etc. Also in FIG. 33, curves b, c indicate the behaviors of other recording heads.

Figure 34:
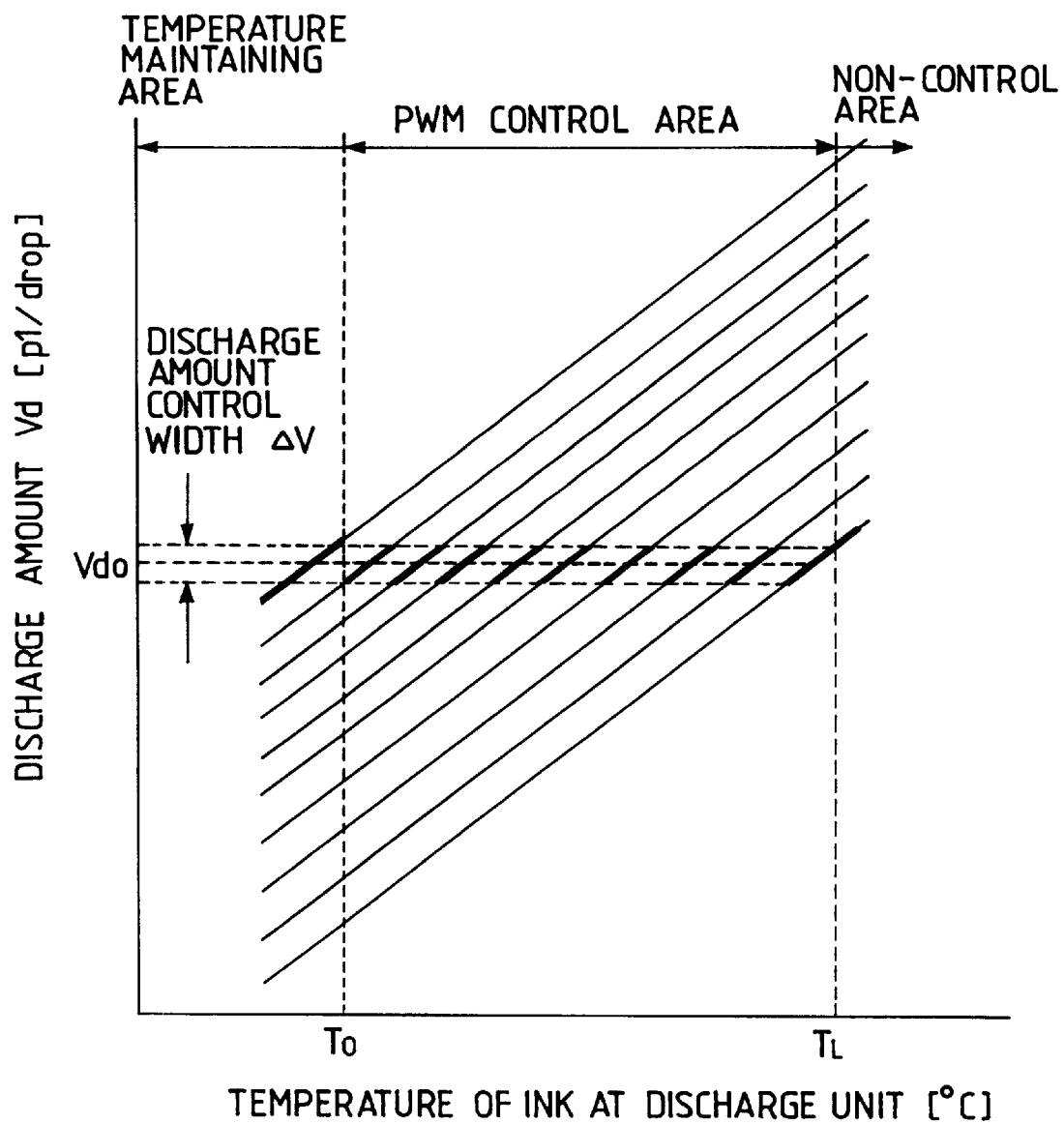
FIG. 34 is a chart relating to the discharge amount control.

FIG. 34 shows an actual control chart, incorporating the relations shown in FIGS. 32 and 33. In FIG. 34, T0 indicates the maintained temperature of the recording head. If the ink temperature at the discharge portion is lower than T0, the recording head is heated with a sub heater (not shown). Consequently the discharge amount control according to the ink temperature is conducted above said temperature T0. In FIG. 34, the discharge amount can be stabilized within a temperature range indicated as the PWM control range, and there is shown the relation between the discharge amount and the ink temperature at the discharge portion when the pre-pulse width is varied in 11 steps. Even in the presence of a variation in the ink temperature at the discharge portion, the discharge amount can be controlled within a width ΔV around the target discharge amount Vd0, by varying the width of the pre-pulse for each temperature step of ΔT of the ink temperature. However, even with this PWM control, the discharge amount cannot be stabilized in a temperature range beyond the upper limit temperature TL of the PWM control.

In the present embodiment, therefore, the discharge amount is regulated by heating with the sub heater, if the temperature of the recording head is lower than T0. Then, within a temperature range from T0 to T1, the discharge amount is regulated by the PWM control. In a temperature range beyond TL wherein the discharge control by such PWM control becomes impossible, the distributed data for the inks of different densities are corrected as explained in the foregoing embodiments 1 and 2. In this manner the tonal reproduction of the recorded image is improved, whereby an image without unevenness in the density can be obtained.

As explained in the foregoing, the present invention, through the combination with the PWM discharge amount control, can improve the tonal rendition over a wider temperature range.

Also in case of preparing plural distribution tables, the present embodiment can reduce the number thereof in comparison with the embodiment 1 or 2, because a situation of low temperature need not be considered.

As detailedly explained in the foregoing, the present invention is to detect the temperature relative to the recording head, to distribute the image data to plural sets of data respectively corresponding to plural kinds of inks, according to the detected temperature data, and to form an image on a recording medium by means of said recording head, based on thus distributed data, thereby being capable of providing the desired recorded image density even in the presence of a variation in the temperature of the recording head, and significantly improving the tonal reproducibility.

The foregoing embodiments employ the ink jet recording head for recording, but such embodiments are not limitative and the present invention is applicable also, for example, to a thermal head or a thermal transfer head.

Among various ink jet recording methods, the present invention brings about a particular effect when applied to a recording head of a system utilizing thermal energy for forming a flying liquid droplet for recording, and a recording apparatus utilizing such recording head.

The principle and representative configuration of said system are disclosed, for example, in the U.S. Pat. Nos. 4,723,129 and 4,740,796. This system Is applicable to so-called on-demand recording or continuous recording, but is particularly effective in the on-demand recording because, in response to the application of at least a drive signal representing the recording information to an electrothermal converter element positions corresponding to a liquid channel or a sheet containing liquid (ink) therein, said element generates thermal energy capable of causing a rapid temperature increase exceeding the nucleate boiling point, thereby inducing film boiling on a heat action surface of the recording head and thus forming a bubble in said liquid (ink), in one-to-one correspondence wit h said drive signal. Said liquid (ink) is discharged through a discharge opening by the growth and contraction of said bubble, thereby forming at least a liquid droplet. Said drive signal is preferably formed as a pulse, as it realizes instantaneous growth and contraction of the bubble, thereby attaining highly responsive discharge of the liquid (ink).

Such pulse-shaped drive signal is preferably that disclosed in the U.S. Pat. Nos. 4,463,359 and 4,345,262. Also the conditions described in the U.S. Pat. No. 4,313,124 relative to the temperature increase rate of said heat action surface allows to obtain further improved recording.

The configuration of the recording head is given by the combinations of the liquid discharge openings, liquid channels and electrothermal converter elements with linear or rectangular liquid channels, disclosed in the above-mentioned patents, but a configuration disclosed in the U.S. Pat. No. 4,558,333 in which the heat action part is positioned in a flexed area, and a configuration disclosed in the U.S. Pat. No. 4,459,600 also belong to the present invention.

Furthermore the present invention is effective in a structure disclosed in the Japanese Patent Laid-open Application No. 59-123670, having a slit common to plural electrothermal converter elements as a discharge opening therefor, or in a structure disclosed in the Japanese Patent Laid-open Application No. 59-138461, having an aperture for absorbing the pressure wave of thermal energy, in correspondence with each discharge opening.

A full-line type recording head, capable of simultaneous recording over the entire width of the recording sheet, may be obtained by plural recording heads so combined as to provide the required length as disclosed in the above-mentioned patents, or may be constructed as a single integrated recording head, and the present invention can more effectively exhibit its advantages in such recording head.

The present invention is furthermore effective in a recording head of interchangeable chip type, which can receive ink supply from the main apparatus and can be electrically connected therewith upon mounting on said main apparatus, or a recording head of cartridge type in which an ink cartridge is integrally constructed with the recording head.

Also the recording apparatus is preferably provided with the discharge recovery means and other auxiliary means for the recording head, since the effects of the recording head of the present invention can be stabilized further. Examples of such means for the recording head include capping means, cleaning means, pressurizing or suction means, preliminary heating means composed of electrothermal converter element and/or another heating device, and means for effecting an idle ink discharge independent from the recording operation, all of which are effective for achieving stable recording operation.

Furthermore, the present invention is not limited to a recording mode for recording a single main color such as black, but is extremely effective also to the recording head for recording plural different colors or full color by color mixing, wherein the recording head is either integrally constructed or is composed of plural units.

In the foregoing embodiments of the present invention, the ink is assumed to be liquid, but the present invention is also applicable to the ink which is solid below room temperature but softens or liquefies at room temperature, or which softens or liquefies within a temperature control range from 30° C. to 70° C., which is ordinarily adopted in the ink jet recording. Thus the ink only needs to be liquid when the recording signal is given.

Furthermore, the present invention is applicable to ink liquefied by thermal energy provided corresponding to the recording signal, such as the ink in which the temperature increase by thermal energy is intentionally absorbed by the state change from solid to liquid, or the ink which remains solid in the unused state for the purpose of prevention of ink evaporation, or the ink which starts to solidify upon reaching the recording sheet. In these cases the ink may be supported as solid or liquid in recesses or holes of a porous sheet, as described in the Japanese Patent Laid-open Application Nos. 54-56847 and 60-71260, and placed in an opposed state to the electrothermal converter element. The present invention is most effective when the above-mentioned film boiling is induced in the ink of the above-mentioned forms.

Furthermore, the recording apparatus of the present invention may be constructed, not only as an integral or separate image output terminal for an information processing equipment such as a word processor or a computer, but also as a copying apparatus combined with an image reader or a facsimile apparatus having the function of transmission and reception.

Figure 35:
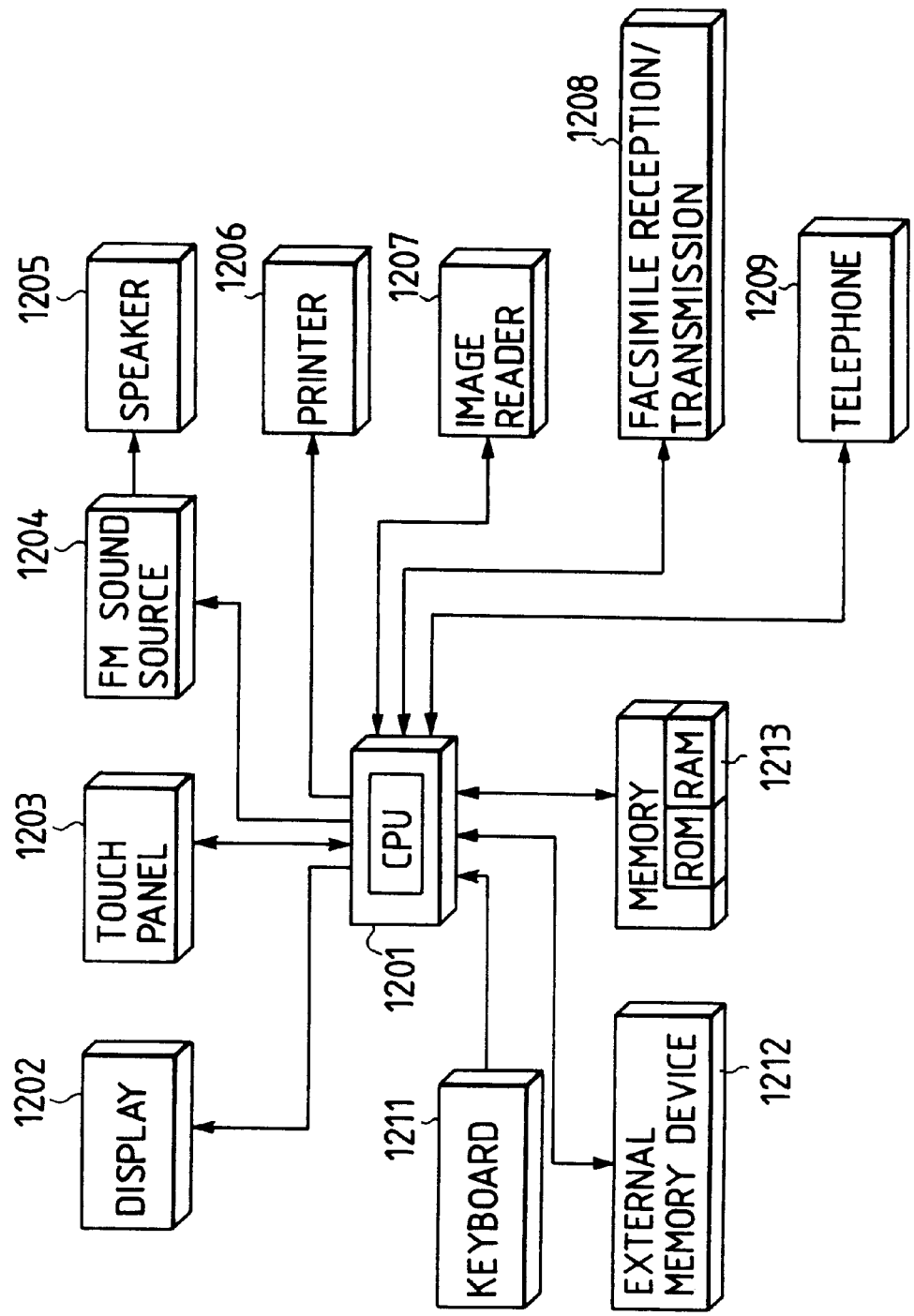
FIG. 35 is a block diagram showing the schematic structure when the present invention is applied to an information processing apparatus.

FIG. 35 is a block diagram showing the schematic configuration, when the ink jet recording apparatus of the present invention is applied to an information processing apparatus having the functions of word processor, personal computer, facsimile apparatus and copying apparatus, wherein provided are a control unit 1201 for controlling the entire apparatus, provided with a CPU such as a microprocessor and various I/O ports and effecting the control by sending control signals and data signals to various units and receiving control signals and data signals therefrom; a display unit 1202 for displaying various menus, document information and image data read by an image reader 1207; and a transparent pressure-sensitive touch panel 1203 provided on said display unit 1202 and serving for the input of an item displayed on the display unit 1202 or the input of coordinates, by a finger pressure applied thereon.

An FM (frequency modulation) sound source unit 1204 reads the sound information, prepared for example by a music editor and stored in a memory 1210 or an external memory 1212 in the form of digital data, and effects frequency modulation. The electrical signal from said FM sound source is converted into audible sound by a loudspeaker 1205. A printer unit 1206 embodies the recording apparatus of the present invention, as an output terminal for the word processor, personal computer, facsimile and copying apparatus.

An image reader 1207, for photoelectrically reading the original data, is positioned in the transport path of the originals, and reads the originals for facsimile transmission, for copying and for other purposes. A facsimile transmission/reception unit 1208 for effecting facsimile transmission of the original data read by the image reader 1207, and reception and decoding of the received facsimile signal, has the function of interfacing with the external line. A telephone unit 1209 has various telephone functions including the ordinary telephone functions and the message telephone function. A memory unit 1210 includes a ROM for storing a system program, a managing program and other application programs, a character font and a dictionary, a RAM for storing application programs loaded from the external memory 1212 and character information, and a video RAM.

A keyboard unit 1211 serves for entering document information and various commands. An external memory 121, employing a floppy disk or a rigid disk as the memory medium, is used for storing character information, music or sound information, application programs of the user etc.

Figure 36:
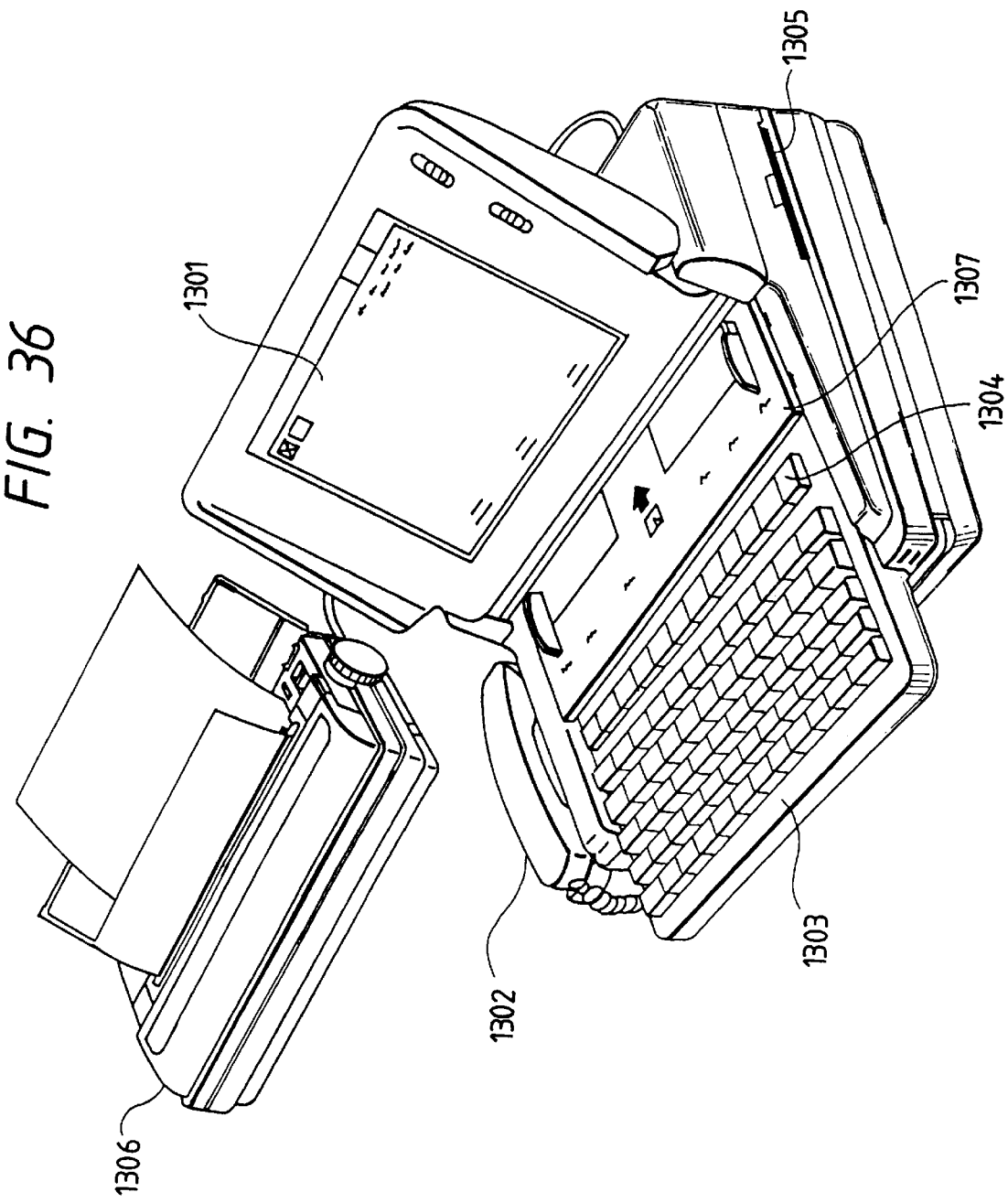
FIG. 36 is an external view of the information processing apparatus.

FIG. 36 is an external view of the information processing apparatus shown in FIG. 35. A flat panel display 1301 is used for displaying various menus, pattern information and document information. On said display 1301 there is provided a touch panel, for entering the coordinates or various items, by pressing for example with a finger. A handset 1302 is used when the apparatus functions as a telephone set.

A keyboard 1303, provided with various function keys 1304, is detachably connected to the main body through a cord, and serves for entering various character information and various data. An insertion slot 1305 for the floppy disk is provided.

A sheet stacker 1307 is used for stacking the originals to be read by the image reader 1207, and the originals after image reading are discharged from the rear part of the apparatus. An ink Jet printer 1306 is provided for image recording for example in the facsimile reception.

The above-mentioned display 1301 may be composed of a cathode ray tube, but is preferably composed of a flat panel display such as liquid crystal display utilizing ferroelectric liquid crystal, because such flat panel display can achieve compactization, a smaller thickness and a lighter weight. In the use of the above-explained information processing apparatus as a personal computer or a word processor, the information entered from the keyboard 1211 shown in FIG. 35 is processed in the control unit 1201 according to a predetermined program, and the result is released as an image from the printer unit 1206. Also in the function as a facsimile reception unit, the facsimile information supplied through a communication channel to the facsimile transmission/reception unit 1208 is processed in the control unit 1201 according to a predetermined program, and the result is released as a received image from the printer unit 1206.

Figure 37:
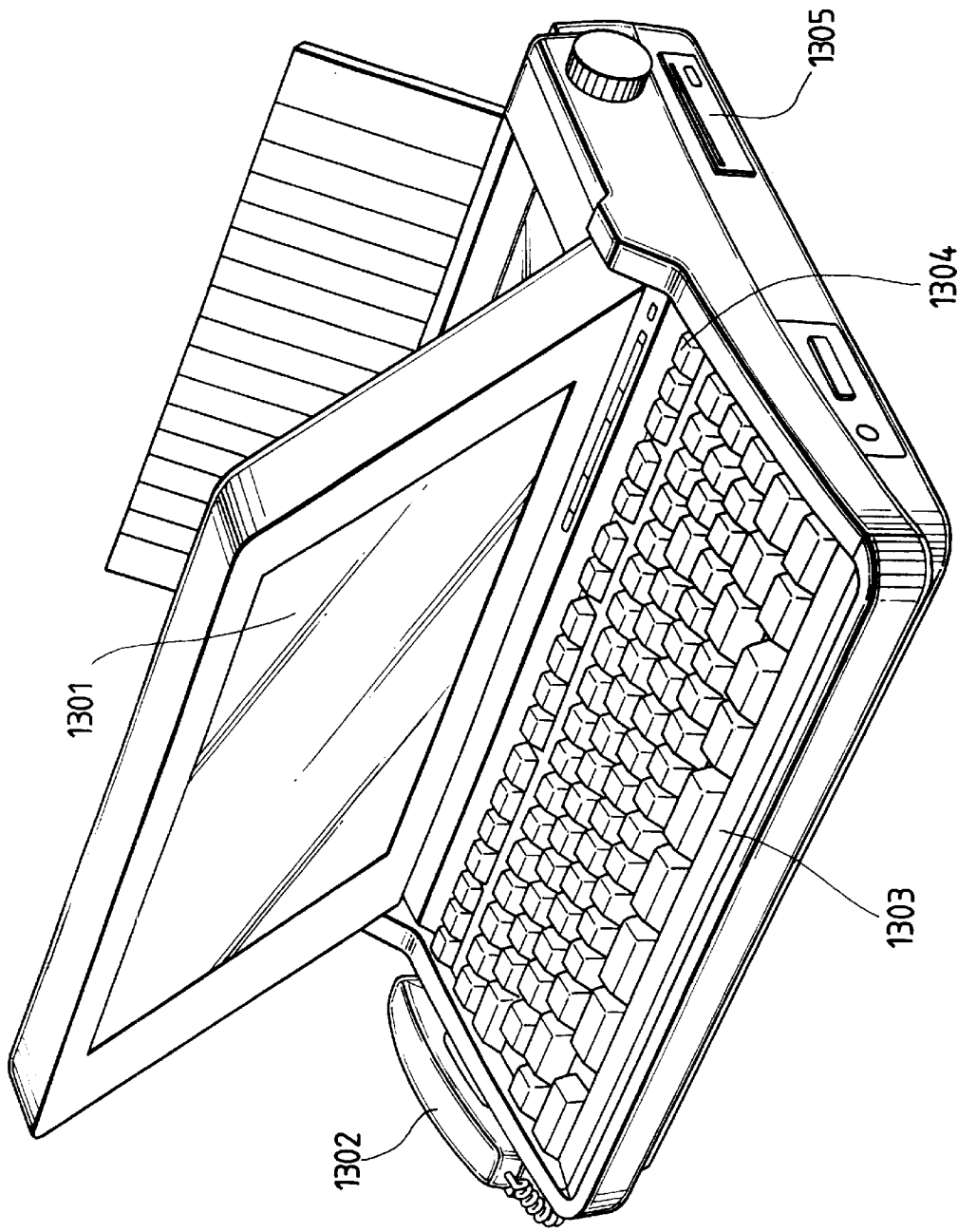
FIG. 37 is an external view showing another example of the information processing apparatus.

Also in the function as a copying apparatus, the original is read by the image reader 1207, and the read original data are supplied through the control unit 1201 and released as a copy image from the printer unit 1206. Also in the function as a facsimile transmitter, the original data read by the image reader 1207 are subjected to a transmission process by the control unit 1201 according to a predetermined program, and the result is transmitted to the communication channel through the facsimile transmission/reception unit 1208. The above-explained information processing apparatus may also be constructed as an integral unit incorporating the ink jet printer as shown in FIG. 37, for achieving improved portability. In FIG. 37, components equivalent to those in FIG. 36 are represented by same numbers.

The application of the recording apparatus of the present invention to the multi-function information processing apparatus explained above allows to obtain a recorded image of higher quality, whereby the functions of said information processing apparatus can be further improved.

As detailedly explained in the foregoing, the present invention, in recording on a recording medium by discharging ink from discharge openings of a recording head utilizing plural inks of different densities of a same color, if stable discharge becomes difficult in at least one of said plural inks, switches a distribution table so as to effect the recording operation with the ink of the remaining kind, thereby providing a proper image.

Also the present invention detects the temperature relative to a recording head, distributes the image data to plural sets of data, respectively corresponding to the plural inks and also corresponding to the detected temperature data, and forms an image on a recording medium with said recording head, based on thus distributed data. It is therefore rendered possible to obtain a desired recorded image density even in the presence of a variation in the temperature of the recording head, thereby significantly improving the total reproducibility.

What is claimed is:

1. A recording apparatus utilizing recording heads corresponding to plural inks of different densities for forming an image on a recording medium by discharging said plural inks of different densities according to image data, comprising:

detection means-for detecting a condition inducing a variation in a discharge state of said recording heads; and means for distributing said image data to output data respectively corresponding to said plural inks of different densities, according to the detection by said detection means and according to an image density indicated by the image data, the output data for recording with said plural inks of different densities at the image density indicated by the image data, wherein said means for distributing selects, from plural distribution tables defining a proportion of use of said plural inks of different densities, a distribution table according to the detection by said detection means, wherein said plural inks of different densities consist of a first ink of a high image density and a second ink of a low image density, and wherein said plural distribution tables include a first table for reference when recording with said first ink and said second ink, a second table for reference when recording with said first ink only, and a third table for reference when recording with said second ink only.

2. A recording apparatus according to claim 1, further comprising said plural distribution tables for defining the proportion of use of said plural inks of different densities.

3. A recording apparatus according to claim 2, wherein said detection means detects a remaining amount of said inks.

4. A recording apparatus according to claim 3, further comprising control means, wherein when said means for distributing selects said first table, said control means controls recording with said second ink until the image density indicated by the image data reaches a predetermined density level, and with said first and second inks when the image density indicated by the image data exceeds said predetermined density level.

5. A recording apparatus according to claim 3, further comprising control means, wherein when said means for distributing selects said third table, said control means controls recording with said second ink until the image density indicated by the image data reaches a predetermined density level, and controls recording plural times to be superposed with said second ink when the image density indicated by the image data exceeds said predetermined density level.

6. A recording apparatus according to claim 1, wherein said plural recording heads record with plural inks of plural colors.

7. A recording apparatus according to claim 1, wherein each of said recording heads comprises a thermal energy conversion member that generates thermal energy to be applied to ink.

8. An ink jet recording apparatus according to claim 7, wherein each of said recording heads induces a state change in ink by applying the thermal energy generated by said thermal energy conversion member to the ink, and discharges ink based on said state change.

9. A recording method utilizing recording heads corresponding to plural inks of different densities and forming an image on a recording medium by discharging said plural inks of different densities according to image data, comprising:

a detection step for detecting a condition inducing a variation in a discharge state of said recording head;

a distribution step for distributing said image data to output data respectively corresponding to said plural inks of different densities, according to the detection in said detection step and image density indicated by said image data, the output data for recording with said plural inks of different densities at the image density indicated by the image data; and a step for effecting recording according to the distributed output data respectively corresponding to the plural inks, wherein said distribution step selects, from plural distribution tables defining a proportion of use of said plural inks of different densities, a distribution table corresponding to the detection in said detection step, wherein said plural inks of different densities include a first ink of a high image density and a second ink of a low image density, and wherein said plural distribution tables include a first table for reference when recording with said first ink and said second ink, a second table for reference when recording with said first ink only, and a third table for reference when recording with second ink only.

10. A recording method according to claim 9 wherein said detection step detects a remaining amount of said inks.

11. A recording method according to claim 9, wherein each of said recording heads is provided with a thermal energy conversion member for effecting recording in said recording effecting step.

12. An ink jet recording method according to claim 11, wherein in said recording effecting step, each of said recording heads induces a state change in ink by the thermal energy generated by said thermal energy conversion member, and discharges ink based on said state change.

13. An ink jet recording method for recording by using a plurality of inks which are of similar colors and have different densities and forming an image by discharging ink from a recording head, said method comprising the steps of:

detecting a condition that a stable ink discharge of at least one ink among the plurality of inks having different densities is difficult;

inputting an image signal;

converting the inputted image signal into recording data corresponding to the plurality of inks having different densities in accordance with an image density of the image signal, said converting step converting the inputted image signal into recording data for obtaining a desired density by using remaining inks when the stable discharge of at least one ink among the plurality of inks having different densities is difficult, wherein in said converting step the image data is converted into the recording data in accordance with a predetermined table and modes of the table are changed when the stable discharge of at least one ink among the plurality of inks having different densities is difficult; and forming an image by discharging ink in accordance with the recording data.

14. An ink jet recording method according to claim 13, wherein in said image forming step plural inks of different densities in each of plural colors are discharged, and, when the stable ink discharge has become difficult for at least one of said plural inks of said plural colors, remaining ink is utilized.

15. An ink jet recording method according to claim 13, wherein said recording head is provided with a thermal energy conversion member for generating thermal energy to be applied to ink in said image forming step.

16. An ink jet recording method according to claim 15, wherein said recording head induces a state change in the ink by the thermal energy generated by said thermal energy conversion member, and discharges the ink based on said state change in said image forming step.

17. A recording apparatus for forming an image on a recording medium, utilizing recording heads corresponding to plural inks of different densities and discharging said plural inks of different densities according to image data, comprising:

remaining amount detection means for detecting remaining amounts of said plural inks; and means for distributing said image data to output data respectively corresponding to said plural inks of different densities, according to an output of said remaining amount detection means and image density indicated by said image data, the output data for recording with said plural inks of different densities at the image density indicated by the image data, wherein said means for distributing selects, from plural distribution tables defining a proportion of user of said plural inks of different densities, a distribution table according to the detection by said detection means, wherein said plural inks of different densities consist of a first ink of a high image density and a second ink of a low image density, and wherein said plural distribution tables include a first table for reference when recording with said first ink and said second ink, a second table for reference when recording with said first ink only, and a third table for reference when recording with said second ink only.

18. A recording apparatus according to claim 17, further comprising control means, wherein when said means for distributing selects said first table, said control means controls recording with said second ink until the image density indicated by the image data reaches a predetermined density level, and with said first ink and said second ink when the image density indicated by the image data exceeds said predetermined density level.

19. A recording apparatus according to claim 17, further comprising control means, wherein when said means for distributing selects said third table, said control means controls recording with said second ink until the image density indicated by the image data reaches a predetermined density level, and controls recording plural times to be superposed with said second ink when the image density indicated by the image data exceeds said predetermined density level.

20. A recording apparatus according to claim 17, wherein said recording heads record with plural inks of plural colors.

21. A recording apparatus according to claim 17, wherein said remaining amount detection means detects the remaining amounts of ink by detecting a resistance between electrodes provided in an ink tank for storing the ink.

22. A recording apparatus according to claim 17, wherein said remaining amount detection means detects remaining amounts by optically detecting the ink in an ink tank for storing the ink.

23. A recording apparatus according to claim 17, wherein said remaining amount detection means detects a negative pressure in an ink tank for storing the ink.

24. A recording apparatus according to claim 17, wherein said recording head comprises a thermal energy conversion member that generates thermal energy to be applied to the ink.

25. An ink jet recording apparatus according to claim 24, wherein said recording head induces a state change in ink by applying the thermal energy generated by said thermal energy conversion member to the ink, and discharges the ink based on said state change.

26. An ink jet recording method for recording by using a plurality of inks which are of similar colors and have different densities, selecting from a plurality of distribution tables, which define a ratio of the plurality of inks having different densities in response to image data, a distribution table corresponding to detection by detecting means and forming an image by discharging ink from a recording head in accordance with said selected distribution table, said method comprising the steps of:

detecting a condition that a stable discharge of at least one ink among the plurality of inks having different densities is difficult;

inputting an image signal; and converting said inputted image signal into recording data corresponding to the plurality of inks having different densities in accordance with an image density of the image signal and converting and changing said selected distribution table when the stable discharge of at least one ink among the plurality of inks having different densities is difficult, the recording data for recording with said plural inks having different densities at the image density of the image data, wherein said plural inks of different densities consist of a first ink of a high image density and a second ink of a low image density, and wherein said plural distribution tables include a first table for reference when recording with said first ink and said second ink, a second table for reference when recording with said first ink only, and a third table for reference when recording with said second ink only.

27. A recording method according to claim 26, further comprising a controlling step for controlling recording, wherein when said first table is selected recording is controlled to be conducted with said second ink until the image density indicated by the image data reaches a predetermined density level, and is controlled to be conducted with said first ink and said second ink when the image density indicated by the image data exceeds said predetermined density level.

28. A recording method according to claim 26, further comprising a controlling step for controlling recording, wherein when said third table is selected recording is controlled to be conducted with said second ink until the image density indicated by the image data reaches a predetermined density level, and the recording is controlled to be conducted plural times to be superposed with said second ink when the image density indicated by the image data exceeds said predetermined density level.

29. A recording method according to claim 26, wherein said second table is selected in said converting step when a remaining amount of said second ink becomes less than a predetermined amount, and said third table is selected when a remaining amount of said first ink becomes less than a predetermined amount.

30. A recording method according to claim 26, wherein said plural inks of different densities comprise plural colors.

31. A recording method according to claim 26, wherein said recording head comprises a thermal energy conversion member for effecting recording in a recording effecting step.

32. An ink jet recording apparatus for recording by using a first ink having a high image density and a second ink having a low image density and selecting from a plurality of distribution tables defining a using ratio of the first ink and the second ink in response to image data a distribution table corresponding to a detection, said apparatus comprising:

detecting means for detecting a density distribution of an image to be formed in response to the image data;

selecting means for selecting said distribution table in accordance with said density distribution of the image; and recording means for forming an image in accordance with said density distribution, wherein said plurality of distribution tables include a first table for reference when recording with the first ink and the second ink, a second table for reference when recording with the first ink only and a third table for reference when recording with the second ink only, and wherein said selecting means selects said second table for high density distribution of the image data and selects said first table for low density distribution of the image data.

33. A recording apparatus according to claim 32, wherein said recording means comprises a thermal energy conversion member that generates thermal energy to be applied to ink.

34. An ink jet recording apparatus according to claim 33, wherein said recording means induces a state change in ink by applying the thermal energy generated by said thermal energy conversion member to the ink, and discharges the ink based on said state change.

* * * * *

UNITED STATES PATENT AND TRADEMARK OFFICE
CERTIFICATE OF CORRECTION

PATENT NO. : 6,027,196

DATED : February 22, 2000

INVENTOR(S) : GOTOH ET AL.

It is certified that error appears in the above-identified patent and that said Letters Patent is hereby corrected as shown below:

[54] In the Title:
"LIGHT-AND" should read --LIGHT- AND--.

COLUMN 1:
Line 2, "LIGHT-AND" should read --LIGHT- AND--.

COLUMN 2:
Line 20, "Jet" should read --jet--.

COLUMN 12:
Line 60, "in-at" should read --in at--.

COLUMN 13:
Line 33, "Jet" should read --jet--.

COLUMN 14:
Line 7, "Jet" should read --jet--.

COLUMN 18:
Line 32, "Jet" should read --jet--.

COLUMN 19:
Line 13, "ink,," should read --ink,--.

COLUMN 20:
Line 21, "AT" should read --ΔT--.
Line 66, "Is" should read --is--.

COLUMN 21:
Line 10, "wit h" should read --with--.

//s

UNITED STATES PATENT AND TRADEMARK OFFICE
CERTIFICATE OF CORRECTION

PATENT NO. : 6,027,196

DATED : February 22, 2000

INVENTOR(S) : GOTOH ET AL.

It is certified that error appears in the above-identified patent and that said Letters Patent is hereby corrected as shown below:

COLUMN 23 :
  Line 25, "Jet" should read --jet--.
  Line 57, "same" should read --the same--.

COLUMN 24:
  Line 20, "means-for" should read --means for--.
  Line 48, "claim 3," should read --claim 1,--.
  Line 56, "claim 3," should read --claim 1,--.

COLUMN 25:
  Line 38, "claim 9" should read --claim 9,--.

COLUMN 26:
  Line 36, "user" should read --use--.

Signed and Sealed this

Twenty-fourth Day of April, 2001

Attest:

NICHOLAS P. GODICI

Attesting Officer        Acting Director of the United States Patent and Trademark Office